United States Patent
Sen et al.

(10) Patent No.: US 9,788,133 B2
(45) Date of Patent: Oct. 10, 2017

(54) SYSTEMS, METHODS, APPARATUS, AND COMPUTER-READABLE MEDIA FOR BACKWARD-COMPATIBLE AUDIO CODING

(71) Applicant: QUALCOMM Incorporated, San Diego, CA (US)

(72) Inventors: Dipanjan Sen, San Diego, CA (US); Pei Xiang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 3 days.

(21) Appl. No.: 15/041,965

(22) Filed: Feb. 11, 2016

(65) Prior Publication Data
US 2016/0219389 A1    Jul. 28, 2016

Related U.S. Application Data

(63) Continuation of application No. 13/844,447, filed on Mar. 15, 2013, now Pat. No. 9,288,603.
(Continued)

(51) Int. Cl.
| | |
|---|---|
| *H04R 5/00* | (2006.01) |
| *H04S 3/00* | (2006.01) |
| *H04S 7/00* | (2006.01) |
| *H04H 20/89* | (2008.01) |
| *G10L 19/008* | (2013.01) |
| *G10L 19/18* | (2013.01) |
| *H04L 29/06* | (2006.01) |
| *G10L 19/16* | (2013.01) |

(52) U.S. Cl.
CPC ............ *H04S 3/006* (2013.01); *G10L 19/008* (2013.01); *G10L 19/167* (2013.01); *G10L 19/18* (2013.01); *H04H 20/89* (2013.01); *H04L 65/605* (2013.01); *H04S 3/002* (2013.01); *H04S 3/008* (2013.01); *H04S 7/30* (2013.01); *H04S 2400/01* (2013.01); *H04S 2400/03* (2013.01); *H04S 2400/07* (2013.01); *H04S 2400/15* (2013.01); *H04S 2420/11* (2013.01)

(58) Field of Classification Search
CPC .......... H04S 3/006; H04S 3/002; H04S 3/008; H04S 7/30; H04S 2400/01; H04S 2400/03; H04S 2400/07; H04S 2420/11; G10L 19/008; G10L 19/167; G10L 19/18
See application file for complete search history.

(56) References Cited

U.S. PATENT DOCUMENTS

| | | |
|---|---|---|
| 6,904,152 B1 | 6/2005 | Moorer |
| 7,298,853 B2 | 11/2007 | Norris et al. |
| | (Continued) | |

FOREIGN PATENT DOCUMENTS

| | | |
|---|---|---|
| CN | 1507701 A | 6/2004 |
| CN | 1735922 A | 2/2006 |
| | (Continued) | |

OTHER PUBLICATIONS

"Call for Proposals for 3D Audio," ISO/IEC JTC1/SC29/WG11/N13411, Jan. 2013, 20 pp.
(Continued)

*Primary Examiner* — Andrew L Sniezek
(74) *Attorney, Agent, or Firm* — Shumaker & Sieffert, P.A.

(57) ABSTRACT

Systems, methods, and apparatus for backward-compatible coding of a set of basis function coefficients that describe a sound field are presented.

24 Claims, 11 Drawing Sheets

Related U.S. Application Data

(60) Provisional application No. 61/671,789, filed on Jul. 15, 2012.

(56) References Cited

U.S. PATENT DOCUMENTS

| | | | |
|---|---|---|---|
| 7,447,317 | B2 | 11/2008 | Herre et al. |
| 7,602,922 | B2 | 10/2009 | Breebaart et al. |
| 7,606,373 | B2 | 10/2009 | Moorer |
| 7,660,424 | B2 | 2/2010 | Davis |
| 8,145,498 | B2 | 3/2012 | Herre et al. |
| 8,379,868 | B2 * | 2/2013 | Goodwin ............. G10L 19/008 381/17 |
| 9,100,768 | B2 | 8/2015 | Batke et al. |
| 9,190,065 | B2 | 11/2015 | Sen |
| 9,288,603 | B2 | 3/2016 | Sen et al. |
| 9,397,771 | B2 | 7/2016 | Jax et al. |
| 2003/0007648 | A1 | 1/2003 | Currell |
| 2004/0247134 | A1 | 12/2004 | Miller et al. |
| 2006/0045275 | A1 | 3/2006 | Daniel |
| 2009/0265164 | A1 | 10/2009 | Yoon et al. |
| 2009/0313029 | A1 | 12/2009 | Luo et al. |
| 2010/0169102 | A1 | 7/2010 | Samsudin |
| 2010/0228552 | A1 | 9/2010 | Suzuki et al. |
| 2011/0249821 | A1 | 10/2011 | Jaillet |
| 2011/0261973 | A1 | 10/2011 | Nelson et al. |
| 2012/0014527 | A1 | 1/2012 | Furse |
| 2012/0093323 | A1 | 4/2012 | Lee et al. |
| 2012/0155653 | A1 | 6/2012 | Jax et al. |
| 2012/0232910 | A1 | 9/2012 | Dressler et al. |
| 2012/0314878 | A1 | 12/2012 | Daniel et al. |
| 2013/0010971 | A1 | 1/2013 | Batke et al. |
| 2013/0148812 | A1 | 6/2013 | Corteel et al. |
| 2014/0016784 | A1 | 1/2014 | Sen et al. |
| 2014/0016802 | A1 | 1/2014 | Sen |
| 2014/0023197 | A1 | 1/2014 | Xiang et al. |
| 2014/0025386 | A1 | 1/2014 | Xiang et al. |
| 2014/0146984 | A1 | 5/2014 | Kim et al. |
| 2014/0219455 | A1 | 8/2014 | Peters et al. |
| 2014/0219456 | A1 | 8/2014 | Morrell et al. |
| 2014/0355768 | A1 | 12/2014 | Sen et al. |
| 2015/0154965 | A1 | 6/2015 | Wuebbolt et al. |
| 2015/0163615 | A1 | 6/2015 | Boehm et al. |

FOREIGN PATENT DOCUMENTS

| | | |
|---|---|---|
| CN | 101044550 A | 9/2007 |
| CN | 102122509 A | 7/2011 |
| CN | 102547549 A | 7/2012 |
| EP | 2094032 A1 | 8/2009 |
| EP | 2469741 A1 | 6/2012 |
| GB | 2478834 A | 9/2011 |
| JP | H09244663 A | 9/1997 |
| JP | 2003531555 A | 10/2003 |
| JP | 2012133366 A | 7/2012 |
| WO | 0182651 A1 | 11/2001 |
| WO | 2012023864 A1 | 2/2012 |
| WO | 2012059385 A1 | 5/2012 |
| WO | 2013000740 A1 | 1/2013 |
| WO | 2013068402 A1 | 5/2013 |
| WO | 2015059081 A1 | 4/2015 |

OTHER PUBLICATIONS

Herre, et al., "MPEG-H 3D Audio—The New Standard for Coding of Immersive Spatial Audio," IEEE Journal of Selected Topics in Signal Processing, vol. 9, No. 5, Aug. 2015, pp. 770-779.

Sen, et al., "RM1-HOA Working Draft Text," ISO/IEC JTC1/SC29/WG11 MPEG2014/M31827, Jan. 2014, 83 pp.

Poletti, "Three-Dimensional Surround Sound Systems Based on Spherical Harmonics," J. Audio Eng. Soc., vol. 53, No. 11, Nov. 2005, pp. 1004-1025.

"Information technology—High efficiency coding and media delivery in heterogeneous environments—Part 3: Part 3: 3D Audio, Amendment 3: MPEG-H 3D Audio Phase 2," ISO/IEC JTC 1/SC 29N, Jul. 25, 2015, 208 pp.

"Information technology—High efficiency coding and media delivery in heterogeneous environments—Part 3: 3D Audio," ISO/IEC JTC 1/SC 29N, Apr. 4, 2014, 337 pp.

"Information technology—High efficiency coding and media delivery in heterogeneous environments—Part 3: 3D Audio," ISO/IEC JTC 1/SC 29, Oct. 12, 2016, 797 pp.

"Information technology—High efficiency coding and media delivery in heterogeneous environments—Part 3: 3D Audio," ISO/IEC JTC 1/SC 29, Jul. 25, 2014, 311 pp.

Hollerweger, et al., "An Introduction to Higher Order Ambisonic," Oct. 2008, 13 pp.

Sen, et al., "Technical Description of the Qualcomm's HOA Coding Technology for Phase 11," ISO/IEC JTC1/SC29/WG11 MPEG2014/M34104, Jul. 2014, 4 pp.

Schonefeld, "Spherical Harmonics," Jul. 1, 2005, 25 pp.

Advanced Television Systems Committee (ATSC): "ATSC Standard: Digital Audio Compression (AC-3, E-AC-3)," Doc. A/52:2012, Digital Audio Compression Standard, Mar. 23, 2012, 269 Pages, Accessed online Jul. 15, 2012.

Bates, "The Composition and Performance of Spatial Music", Ph.D. thesis, Univ. of Dublin, Aug. 2009, pp. 257, Accessed online Jul. 22, 2013 at http://endabates.net/Enda%20Bates%20-%20The%20Composition%20and%20Performance%20of%20Spatial%20Music.pdf.

Boehm J., "Decoding for 3D," AES Convention 130; May 2011, AES, 60 East 42nd Street, room 2520 New york 10165-2520, USA, May 13, 2011 (May 13, 2011), pp. 1-16, XP040567441, Section 3.

Breebaart, et al., "Background, Concept, and Architecture for the Recent MPEG Surround Standard on Multichannel Audio Compression", pp. 21, J. Audio Eng. Soc., vol. 55, No. 5, May 2007, Accessed online Jul. 9, 2012; available online Jul. 22, 2013 at www.jeroenbreebaart.com/papers/jaes/jaes2007.pdf.

Breebaart, et al., "Binaural Rendering in MPEG Surround", EURASIP Journal on Advances in Signal Processing, vol. 2008, Nov. 1, 2008, Article ID 732895, 1-14 pages.

Breebaart, et al., "MPEG Spatial Audio coding/MPEG surround: Overview and Current Status," Audio Engineering Society Convention Paper, Presented at the 119th Convention, Oct. 7-10, 2005, USA, 17 pages.

Breebaart, et al., "Parametric Coding of Stereo Audio", EURASIP Journal on Applied Signal Processing 2005:9, pp. 1305-1322. (Note: Applicant points out in accordance with MPEP 609.04(a) that the 2005 year of publication is sufficiently earlier than the effective U.S. filed and any foreign priority date of Jul. 15, 2012 so that the particular month of publication is not in issue.).

Craven P.G., et al., "Hierarchical Lossless Transmission of Surround Sound Using MLP," AES 24th International conference on Multichannel Audio, Jun. 2003, pp. 1-17.

Engdegard et al. "Spatial Audio Object Coding (SAOC)—The Upcoming MPEG Standard on Parametric Object Based Audio Coding", Proc. of the 124th AES Convention, May 17-20, 2008, 15 pp.

European Broadcasting Union (EBU): "Specification of the Broadcast Wave Format (BWF): A format for audio data files in broadcasting, Supplement 1—MPEG audio", EBU-TECH 3285-E Supplement 1, Jul. 1997, Geneva, CH. pp. 14, Available online Jul. 22, 2013 at https://tech.ebu.ch/docs/tech/tech3285s1.pdf.

European Broadcasting Union (EBU): "Specification of the Broadcast Wave Format (BWF): A format for audio data files in broadcasting, Supplement 2—Capturing Report", EBU-Tech 3285 Supplement 2, Jul. 2001, Geneva, CH. pp. 14, Available online Jul. 22, 2013 at https://tech.ebu.ch/docs/tech/tech3285s2.pdf.

European Broadcasting Union (EBU): "Specification of the Broadcast Wave Format (BWF): A format for audio data files in broadcasting, Supplement 3—Peak Envelope Chunk", EBU-Tech 3285 Supplement 3, Jul. 2001, Geneva, CH. pp. 8, Available online Jul. 22, 2013 at https://tech.ebu.ch/docs/tech/tech3285s3.pdf.

European Broadcasting Union (EBU): "Specification of the Broadcast Wave Format (BWF): A format for audio data files in broadcasting, Supplement 4: Chunk", EBU-Tech 3285 Supplement 4,

(56) References Cited

OTHER PUBLICATIONS

Apr. 2003, Geneva, CH. pp. 4, Available online Jul. 22, 2013 at https://tech.ebu.ch/docs/tech/tech3285s4.pdf.
European Broadcasting Union (EBU): "Specification of the Broadcast Wave Format (BWF): A format for audio data files in broadcasting, Supplement 5: Chunk", EBU-Tech 3285 Supplement 5, Jul. 2003, Geneva, CH. pp. 3, Available online Jul. 22, 2013 at https://tech.ebu.ch/docs/tech/tech3285s5.pdf.
European Broadcasting Union (EBU): "Specification of the Broadcast Wave Format (BWF): A format for audio data files in broadcasting Version 2.0.", EBU-Tech 3285, May 2011, Geneva, CH. pp. 20, Available online Jul. 22, 2013 at https://tech.ebu.ch/docs/tech/tech3285.pdf.
European Broadcasting Union (EBU): "Specification of the Broadcast Wave Format (BWF): A format for audio data files, Supplement 6: Dolby Metadata, chunk", EBU-Tech 3285 suppl.6, Oct. 2009, Geneva, CH. pp. 46, Available online Jul. 22, 2013 at https://tech.ebu.ch/docs/tech/tech3285s6.pdf.
Fraunhofer Institute for Integrated Circuits: "White Paper: An Introduction to MP3 Surround", 2012, pp. 17, Accessed online Jul. 10, 2012; available online Jul. 22, 2013 at http://www.iis.fraunhofer.de/content/dam/iis/de/dokumente/amm/wp/introduction_mp3surround_03-2012.pdf.
Gupta A., et al., "Three-Dimensional Sound Field Reproduction Using Multiple Circular Loudspeaker Arrays," IEEE Transactions on Audio, Speech, and Language Processing, vol. 19 (5), Jul. 2011, pp. 1149-1159.
Herre J., "Efficient Representation of Sound Images: Recent Developments in Parametric Coding of Spatial Audio," pp. 40, Accessed online Jul. 9, 2012; accessed online Jul. 22, 2012 at www.img.lx.it.pt/pcs2007/presentations/JurgenHere_Sound_Images.pdf.
Herre J., et al., "An Introduction to MP3 Surround", pp. 9, Accessed online Jul. 10, 2012; available online Jul. 22, 2013 at http://www.iis.fraunhofer.de/content/dam/iis/en/dokumente/AMM/introduction_to_mp3surround.pdf.
Herre J., et al., "MPEG Surround—The ISO/MPEG Standard for Efficient and Compatible Multichannel Audio Coding", J. Audio Eng. Soc., vol. 56, No. 11, Nov. 2008, pp. 24, Accessed online Jul. 9, 2012; available online Jul. 22, 2013 at www.jeroenbreebaart.com/papers/jaes/jaes2008.pdf.
Herre J., et al., "The Reference Model Architecture for MPEG Spatial Audio Coding", May 28-31, 2005, pp. 13, Accessed online Jul. 11, 2012; available online Jul. 22, 2013 at http://www.iis.fraunhofer.de/content/dam/iis/de/dokumente/amm/conference/AES6447_MPEG_Spatial_Audio_Reference_Model_Architecture.pdf.
Herre J., "Personal Audio: From Simple Sound Reproduction to Personalized Interactive Rendering", pp. 22, Accessed online Jul. 9, 2012; available online Jul. 22, 2013 at http://www.audiomostly.com/amc2007/programme/presentations/AudioMostlyHerre.pdf.
International Preliminary Report on Patentability from International Application No. PCT/US2013/046369. dated Jan. 29, 2015, 8 pp.
International Search Report and Written Opinion—PCT/US2013/046369, International Search Authority—European Patent Office, dated Sep. 25, 2013, 11 pp.
International Telecommunication Union (ITU): "Recommendation ITU-R BS.775-1: Multichannel Stereophonic Sound System With and Without Accompanying Picture", pp. 10, Jul. 1994.
ISO/IEC 14496-3:2009, "Information technology—Coding of audio-visual objects—Part 3: Audio," Int'l Org. for Standardization, Geneva, CH [filed in parts] Applicant points out that, in accordance with MPEP 609.04(a), the 2009 year of publication is sufficiently earlier than the effective U.S. filed and any foreign priority date of Mar. 15, 2013 so that the particular month of publication is not in issue.).
Daniel J., "Spatial Sound Encoding Including Near Field Effect: Introducing Distance Coding Filters and a Viable, New Ambisonic Format," AES 23rd International Conference, Copenhagen, Denmark, May 23-25, 2003 (corrected Jul. 21, 2006), pp. 15.
Jot J.M., et al., "A Backward Compatible and Scalable approach to 3-D Audio Coding", MPEG 3D Audio Workshop, at the 99th MPEG meeting in San Jose, CA, Feb. 8, 2012, 25 Pages.
Laborie A., et al., "A New Comprehensive Approach of Surround Sound Recording," AES Convention: 114, Paper No. 5717, Mar. 2003, 20 Pages.
"SRS Labs Successfully Completes Development of Multi-Dimensional Audio Specification 1.0; MDA Platform Enters Beta Testing Phase", BusinessWire, Mar. 22, 2012, 3 Pages. Retrieved from Internet: URL: http://www.businesswire.com/news/home/20120322005556/en/SRS-Labs-Successfully-Completes-Development-Multi-Dimensional-Audio#.VbvXGPmqqkp.
Malham D., "Spherical Harmonic Coding of Sound Objects—the Ambisonic 'O' Format," pp. 4, Accessed online Jul. 13, 2012; available online Jul. 22, 2013 at <URL: pcfarina.eng.unipr.it/Public/O-format/AES19-Malham.pdf>.
"MDA; Object-Based Audio Immersive Sound Meta data and Bitstream," EBU Operating Eurovision, ETSI TS 103 223 V1.1.1, Apr. 2015, 73 pp.
Melchior, et al., "Spatial audio authoring for Ambisonic reproduction", 1st Ambisonics Symposium, Graz, Austria, Jun. 25-27, 2009, 6 pp.
Painter, et al., Perceptual Coding of Digital Audio, Proceedings of the IEEE, vol. 88, No. 4, Apr. 2000, pp. 451-513.
Poletti M., "Three-Dimensional Surround Sound Systems Based on Spherical Harmonics," The Journal of the Audio Engineering Society, Nov. 2005, pp. 1004-1025, vol. 53 (11).
Poletti M., "Unified Description of Ambisonics Using Real and Complex Spherical Harmonics," Ambisonics Symposium Jun. 25-27, 2009, 10 Pages.
Bruno, et al., "Reproducing Multichannel Sound on any Speaker Layout", AES Convention 118; May 2005, AES, 60 East 42nd Street, Room 2520 New York 10165-2520, USA, May 28, 2005, XP040507183, 18 pp.
Sen D., et al., "Differences and Similarities in Formats for Scene Based Audio," ISO/IEC JTC1/SC29/WG11MPEG2012/M26704, Oct. 2012, Shanghai, China, 7 Pages.
Sen D., et al., "Psychoacoustically Motivated Frequency Dependent Tikhonov Regularization for Soundfield Parameterization," Proc. IEEE International Conference on Acoustics Speech and Signal Processing (ICASSP), Mar. 2010, Dallas, USA.
"Transforming Ambiophonic+Ambisonic 3D Surround Sound to & from ITU 5.1 /6.1", AES, 60 East 42nd Street, Room 2520 New York, pp. 10165-2520,Mar. 25, 2003, USA, XP04037217.
"Wave PCM soundfile format", pp. 4, Accessed online Dec. 3, 2012 at https://cerma.stanford.edu/courses/422/projects/WaveFormat/.
Zotter F., et al., "The Virtual T-Design Ambisonics-Rig Using VBAP", 1st EAA—EuroRegio Congress on Sound and Vibration, Sep. 16, 2010 (Sep. 16, 2010), XP002713480, Retrieved from the Internet: URL:http:ffold.iem.at/Members/zotter/2010_ZotterFrankSontacchi_tdsgnAmbiVBAP_Euroreg io.pdf, [retrieved on Sep. 19, 2013].
Zyber J, "SRS Labs Multi-Dimensional Audio High Def Digest," The Bonus View, May 24, 2012, 4 Pages. Retrieved from Internet: URL:http://www.highdefdigest.com/blog/srs-labs-mda-audio/.
International Search Report and Written Opinion—PCT/US2013/050648, International Search Authority—European Patent Office, dated Sep. 10, 2013, 17 pp.

\* cited by examiner

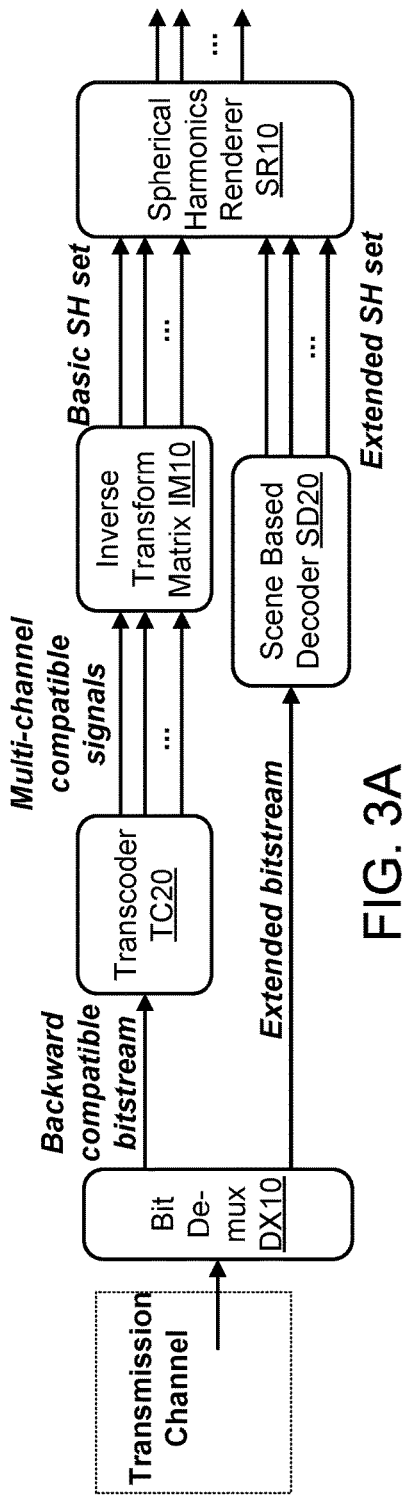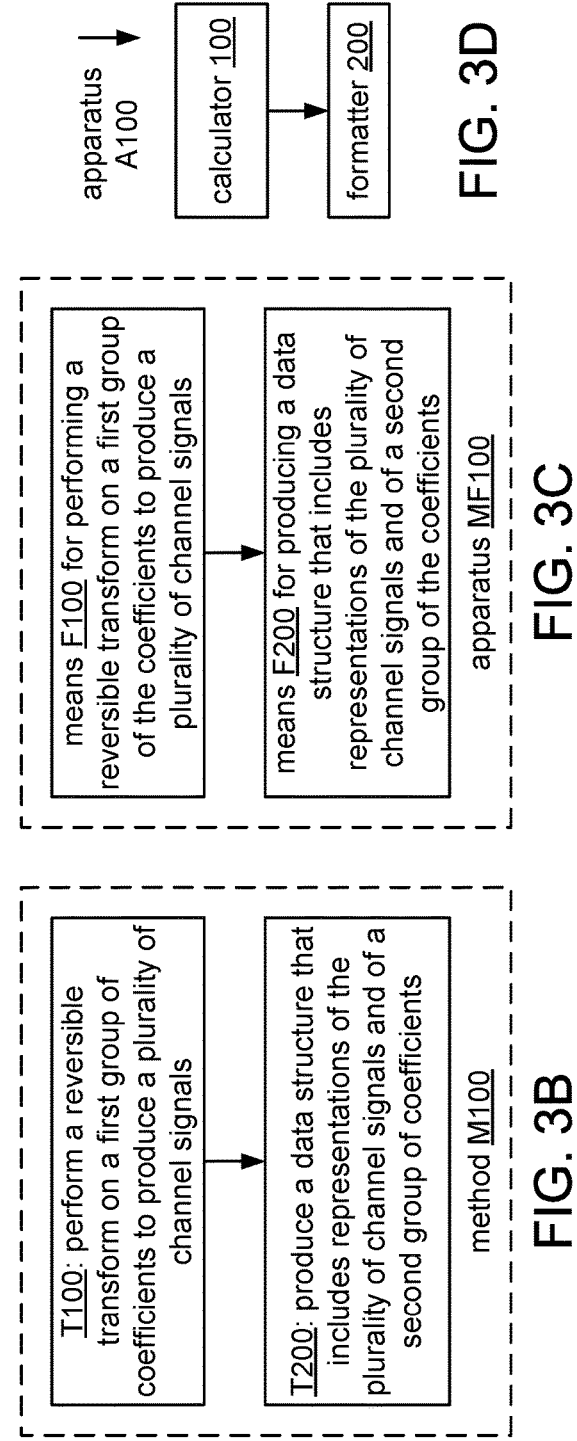

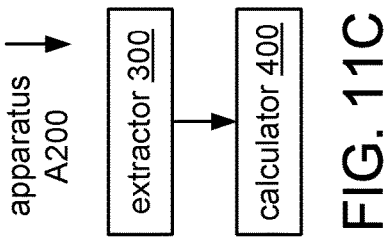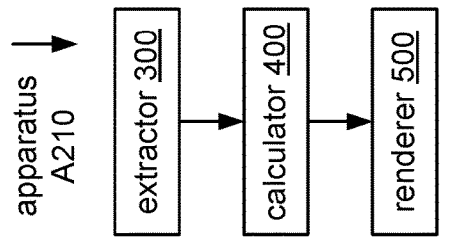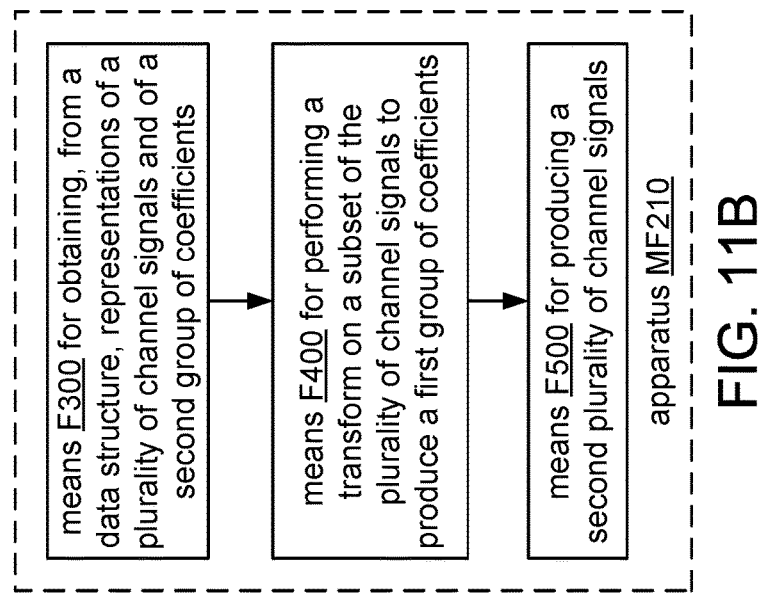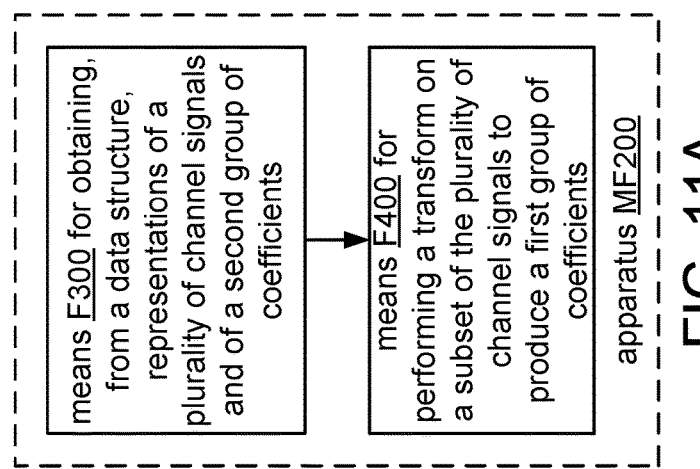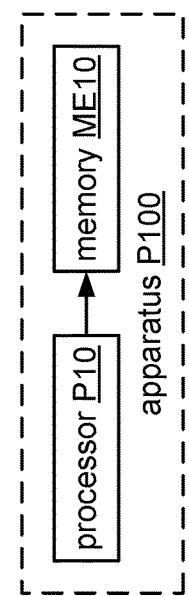

US 9,788,133 B2

SYSTEMS, METHODS, APPARATUS, AND COMPUTER-READABLE MEDIA FOR BACKWARD-COMPATIBLE AUDIO CODING

The present Application for Patent is a continuation of U.S. patent application Ser. No. 13/844,447, filed Mar. 15, 2013, which claims the benefit of U.S. Provisional Application No. 61/671,789, entitled "PROVIDING BACKWARD COMPATIBILITY WHEN USING SPHERICAL HARMONICS COEFFICIENTS FOR SPATIAL AUDIO REPRESENTATION," filed Jul. 15, 2012, the entire contents of each of which is incorporated herein by reference.

BACKGROUND

Field

This disclosure relates to spatial audio coding.

Background

The evolution of surround sound has made available many output formats for entertainment nowadays. The range of surround-sound formats in the market includes the popular 5.1 home theatre system format, which has been the most successful in terms of making inroads into living rooms beyond stereo. This format includes the following six channels: front left (L), front right (R), center or front center (C), back left or surround left (Ls), back right or surround right (Rs), and low frequency effects (LFE)). Other examples of surround-sound formats include the growing 7.1 format and the futuristic 22.2 format developed by NHK (Nippon Hoso Kyokai or Japan Broadcasting Corporation) for use, for example, with the Ultra High Definition Television standard. It may be desirable for a surround sound format to encode audio in two dimensions and/or in three dimensions.

SUMMARY

A method, according to a general configuration, of processing a plurality of basis function coefficients is described. The plurality of basis function coefficients describes a sound field during a time interval. This method includes performing a reversible transform on a first group of the plurality of basis function coefficients to produce a plurality of channel signals, wherein each of the plurality of channel signals is associated with a corresponding different region of space. This method also includes producing a data structure, based on the plurality of channel signals, that includes (A) a representation of a second group of the plurality of basis function coefficients, wherein the second group is different than the first group, and (B) a representation of the plurality of channel signals that is separate from the representation of the second group. Computer-readable storage media (e.g., non-transitory media) having tangible features that cause a machine reading the features to perform such a method are also disclosed.

An apparatus, according to a general configuration, for processing a plurality of basis function coefficients is described. The plurality of basis function coefficients describes a sound field during a time interval. This apparatus includes means for performing a reversible transform on a first group of the plurality of basis function coefficients to produce a plurality of channel signals, wherein each of the plurality of channel signals is associated with a corresponding different region of space. This apparatus also includes means for producing a data structure, based on the plurality of channel signals, that includes (A) a representation of a second group of the plurality of basis function coefficients, wherein the second group is different than the first group, and (B) a representation of the plurality of channel signals that is separate from said representation of the second group.

An apparatus, according to another general configuration, for processing a plurality of basis function coefficients is described. The plurality of basis function coefficients describes a sound field during a time interval. This apparatus includes a calculator configured to perform a reversible transform on a first group of the plurality of basis function coefficients to produce a plurality of channel signals, wherein each of the plurality of channel signals is associated with a corresponding different region of space. This apparatus also includes a data formatter configured to produce a data structure, based on the plurality of channel signals, that includes (A) a representation of a second group of the plurality of basis function coefficients, wherein the second group is different than the first group, and (B) a representation of the plurality of channel signals that is separate from said representation of the second group.

BRIEF DESCRIPTION OF THE DRAWINGS

FIG. 3A shows an example of a decoding process with a new device that can handle scene-based data.

FIG. 3B shows a flowchart of a method of audio signal processing M100 according to a general configuration.

FIG. 3C shows a block diagram of an apparatus MF100 for audio signal processing according to a general configuration.

FIG. 3D shows a block diagram of an apparatus A100 for audio signal processing according to another general configuration.

FIG. 11A shows a block diagram of an apparatus MF200 for audio signal processing according to a general configuration.

FIG. 11B shows a block diagram of an implementation MF210 of apparatus MF100.

FIG. 11C shows a block diagram of an apparatus A200 for audio signal processing according to another general configuration.

FIG. 11D shows a block diagram of an implementation A210 of apparatus A100.

FIG. 11E shows a block diagram of an apparatus P100 for audio signal processing according to another general configuration.

DETAILED DESCRIPTION

Figure 1A:
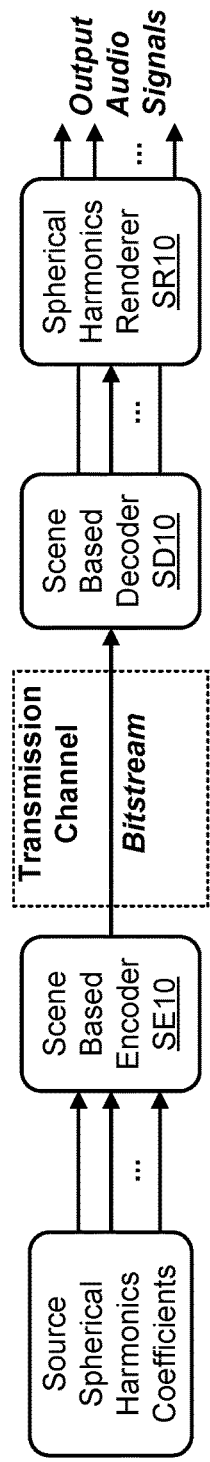
FIG. 1A shows an example of scene-based coding without consideration of backward compatibility.

Unless expressly limited by its context, the term "signal" is used herein to indicate any of its ordinary meanings, including a state of a memory location (or set of memory locations) as expressed on a wire, bus, or other transmission medium. Unless expressly limited by its context, the term "generating" is used herein to indicate any of its ordinary meanings, such as computing or otherwise producing. Unless expressly limited by its context, the term "calculating" is used herein to indicate any of its ordinary meanings, such as computing, evaluating, estimating, and/or selecting from a plurality of values. Unless expressly limited by its context, the term "obtaining" is used to indicate any of its ordinary meanings, such as calculating, deriving, receiving (e.g., from an external device), and/or retrieving (e.g., from an array of storage elements). Unless expressly limited by its context, the term "selecting" is used to indicate any of its ordinary meanings, such as identifying, indicating, applying, and/or using at least one, and fewer than all, of a set of two or more. Where the term "comprising" is used in the present description and claims, it does not exclude other elements or operations. The term "based on" (as in "A is based on B") is used to indicate any of its ordinary meanings, including the cases (i) "derived from" (e.g., "B is a precursor of A"), (ii) "based on at least" (e.g., "A is based on at least B") and, if appropriate in the particular context, (iii) "equal to" (e.g., "A is equal to B"). Similarly, the term "in response to" is used to indicate any of its ordinary meanings, including "in response to at least."

References to a "location" of a microphone of a multi-microphone audio sensing device indicate the location of the center of an acoustically sensitive face of the microphone, unless otherwise indicated by the context. The term "channel" is used at times to indicate a signal path and at other times to indicate a signal carried by such a path, according to the particular context. Unless otherwise indicated, the term "series" is used to indicate a sequence of two or more items. The term "logarithm" is used to indicate the base-ten logarithm, although extensions of such an operation to other bases are within the scope of this disclosure. The term "frequency component" is used to indicate one among a set of frequencies or frequency bands of a signal, such as a sample of a frequency domain representation of the signal (e.g., as produced by a fast Fourier transform) or a subband of the signal (e.g., a Bark scale or mel scale subband).

Unless indicated otherwise, any disclosure of an operation of an apparatus having a particular feature is also expressly intended to disclose a method having an analogous feature (and vice versa), and any disclosure of an operation of an apparatus according to a particular configuration is also expressly intended to disclose a method according to an analogous configuration (and vice versa). The term "configuration" may be used in reference to a method, apparatus, and/or system as indicated by its particular context. The terms "method," "process," "procedure," and "technique" are used generically and interchangeably unless otherwise indicated by the particular context. The terms "apparatus" and "device" are also used generically and interchangeably unless otherwise indicated by the particular context. The terms "element" and "module" are typically used to indicate a portion of a greater configuration. Unless expressly limited by its context, the term "system" is used herein to indicate any of its ordinary meanings, including "a group of elements that interact to serve a common purpose."

Any incorporation by reference of a portion of a document shall also be understood to incorporate definitions of terms or variables that are referenced within the portion, where such definitions appear elsewhere in the document, as well as any figures referenced in the incorporated portion. Unless initially introduced by a definite article, an ordinal term (e.g., "first," "second," "third," etc.) used to modify a claim element does not by itself indicate any priority or order of the claim element with respect to another, but rather merely distinguishes the claim element from another claim element having a same name (but for use of the ordinal term). Unless expressly limited by its context, each of the terms "plurality" and "set" is used herein to indicate an integer quantity that is greater than one.

The current state of the art in consumer audio is spatial coding using channel-based surround sound, which is meant to be played through loudspeakers at pre-specified positions. Another approach to spatial audio coding is object-based audio, which involves discrete pulse-code-modulation (PCM) data for single audio objects with associated metadata containing location coordinates of the objects in space (amongst other information).

A further approach to spatial audio coding (e.g., to surround-sound coding) is scene-based audio, which involves representing the sound field using coefficients of spherical harmonic basis functions. Such coefficients are also called "spherical harmonic coefficients" or SHC. FIG. 1A depicts a straightforward encoding and decoding process with a scene-based approach. In this example, scene-based encoder SE10 produces a description of the SHC that is transmitted (and/or stored) and decoded at the scene-based decoder SD10 to receive the SHC for rendering (e.g., by SH renderer SR10). Such encoding may include one or more lossy or lossless coding techniques for bandwidth compression, such as quantization (e.g., into one or more codebook indices), error correction coding, redundancy coding, etc. Additionally or alternatively, such encoding may include encoding audio channels (e.g., microphone outputs) into an Ambisonic format, such as B-format, G-format, or Higher-order Ambisonics (HOA). In general, encoder SE10 may encode the SHC using techniques that take advantage of redundancies among the coefficients and/or irrelevancies (for either lossy or lossless coding).

Figure 1B:
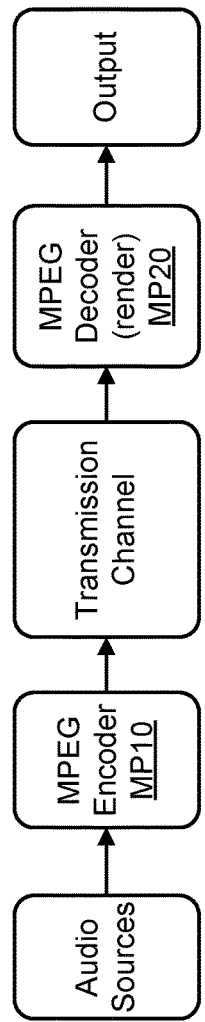
FIG. 1B illustrates a general structure for standardization using an MPEG codec.

It may be desirable to provide an encoding of spatial audio information into a standardized bit stream and a subsequent decoding that is adaptable and agnostic to the speaker geometry and acoustic conditions at the location of the renderer. Such an approach may provide the goal of a uniform listening experience regardless of the particular setup that is ultimately used for reproduction. FIG. 1B illustrates a general structure for such standardization, using an MPEG codec. In this example, the input audio sources to encoder MP10 may include any one or more of the following, for example: channel-based sources (e.g., 1.0 (monophonic), 2.0 (stereophonic), 5.1, 7.1, 11.1, 22.2), object-based sources, and scene-based sources (e.g., high-order spherical harmonics, Ambisonics). Similarly, the audio output produced by decoder (and renderer) MP20 may include any one or more of the following, for example: feeds for monophonic, stereophonic, 5.1, 7.1, and/or 22.2 loudspeaker arrays; feeds for irregularly distributed loudspeaker arrays; feeds for headphones; interactive audio.

It may also be desirable to follow a 'create-once, use-many' philosophy in which audio material is created once (e.g., by a content creator) and encoded into formats which can subsequently be decoded and rendered to different outputs and loudspeaker setups. A content creator such as a Hollywood studio, for example, would typically like to produce the soundtrack for a movie once and not expend the effort to remix it for each possible loudspeaker configuration.

The input to MPEG encoder MP10 in the standardized example of FIG. 1B is optionally one of a channel-based format, an object-based format, and a scene-based format. There are a multitude of advantages of using a scene-based format. However, one possible disadvantage of using such a format is a lack of backward compatibility to existing consumer audio systems. The lack of backward compatibility when using SHC is due to the fact that SHC are not PCM data. Existing receivers that lack the new scene-based decoder (also called "legacy" systems) cannot decode such signals and would not be able to play the program. This disclosure describes methods, systems, and apparatus that may be used to address this lack of backward compatibility when using hierarchical sets of coefficients (e.g., SHC, or coefficients of other basis function sets) to represent a sound field.

The approach described herein provides a solution to a potential disadvantage in the use of SHC-based representation of sound fields. Without this solution, the SHC-based representation will be difficult to deploy, due to the significant disadvantage imposed by not being able to have functionality in the millions of existing legacy playback systems.

Figure 1C:
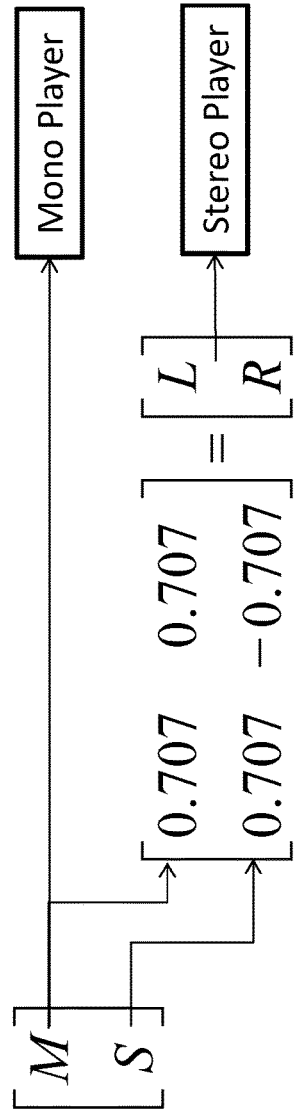
FIG. 1C shows a backward compatible example for mono/stereo.

Backward compatibility was a concern even when the stereophonic format was first introduced, as it was necessary for legacy monophonic-playback systems to retain compatibility. In this case, mono-stereo backward compatibility was retained using matrixing. The stereo 'M-middle' and 'S-Side' format is able to retain compatibility with mono-capable systems by using just the M channel. As shown in FIG. 1C, stereo-capable systems perform a simple 2×2 matrix operation to decode the 'L-left' and 'R-Right' channels.

The M-S signal can be computed from the L-R signal by using the inverse of the above matrix (which happens to be identical). In this manner, the legacy monophonic player retains functionality, while the stereophonic player can decode the Left and Right channels accurately. In a similar manner, a third channel can be added that retains backward-compatibility, preserving the functionality of the monophonic player and the stereophonic player and adding the functionality of a three-channel player.

Extensions of a traditional 5.1 channel-based matrixed audio approach to include additional channels can bypass the problem of backward compatibility by including the 5.1 samples as a subset of the extended channel format. For example, most existing consumer audio systems accept 5.1-channel input. In a backward-compatible extended bitstream, the 5.1 samples are in a location recognized by legacy systems, and the extra channels are located, for example, in an extended portion of a frame packet that contains all of the channel samples. Another example of such an approach is a Dolby Digital Plus bitstream (Dolby Laboratories, Inc., San Francisco, Calif.), which includes a core packet with a 5.1 mix and an extension packet with four surround channels of a 7.1 mix. Alternatively, a decoder may be configured to determine the 5.1 channel data by performing a matrixing operation on the higher number of channels.

One proposed approach for addressing the issue of backward compatibility in an object-based format is to send a downmixed 5.1-channel signal along with the objects. In such a scenario, the legacy channel-based systems would play the downmixed 5.1 channel-based audio, while more advanced renderers would use either a combination of the 5.1 audio and the individual audio objects, or just the individual objects, to render the sound field. Unfortunately, such an approach to backward compatibility may use bandwidth inefficiently by sending the same audio information in two different formats.

This disclosure includes descriptions of systems, methods, and apparatus in which two portions of a hierarchical set of elements (e.g., a set of SHC) that describes a sound field are processed differently. In this approach, a subset of the elements is converted (e.g., using a transform matrix as detailed below) to obtain a set of multichannel audio signals. Such an approach may be used to convert a subset of the hierarchical set (a "basic set") to multiple channels of audio that are compatible with a traditional multichannel audio format. Such an approach may also be configured to obtain any desired number of channels to maintain backward compatibility. Examples of aspects of such a backward-compatible system are summarized in the system diagrams in FIGS. 2A, 2B, and 3A, with explanations on both encoder and decoder structures.

Figure 2A:
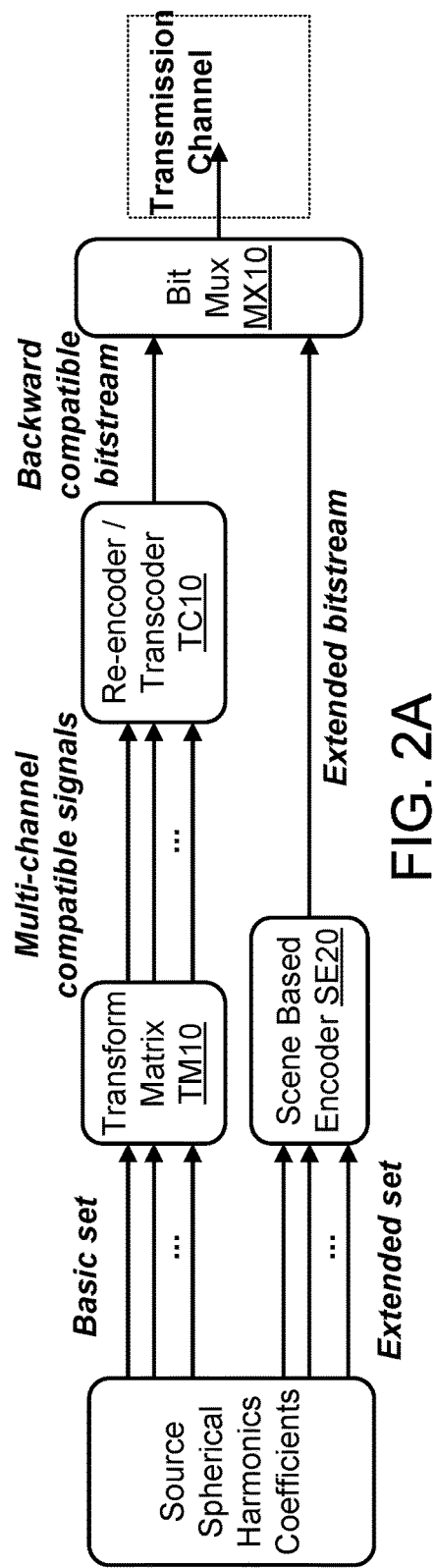
FIG. 2A shows an example of an encoding process with a backward-compatible design.

FIG. 2A shows a general example of such an encoding approach. One particular use is to convert a basic set of a complete set of SHC (which might otherwise be used if backward compatibility were not an issue) to multiple channels that represent a traditional multichannel audio format (e.g., as produced by transform matrix TM10 and re-encoder/transcoder TC10). The rest of the set of SHC (e.g., the coefficients that were not part of the subset) are regarded as an extended set that are not converted and may be separately encoded (by an implementation SE20 of scene-based encoder SE10, e.g., for bandwidth compression) for transmission via a transmission channel (e.g., a wired and/or wireless channel), and/or for storage, alongside the backward-compatible multichannel audio encoded signals (e.g., in a packet or bitstream as described herein and produced in this example by bitstream multiplexer MX10). For example, these encoded bits may be packed into an extended portion of a bitstream or an extended portion of a packet for the frame (e.g., a user-defined portion).

Figure 2B:
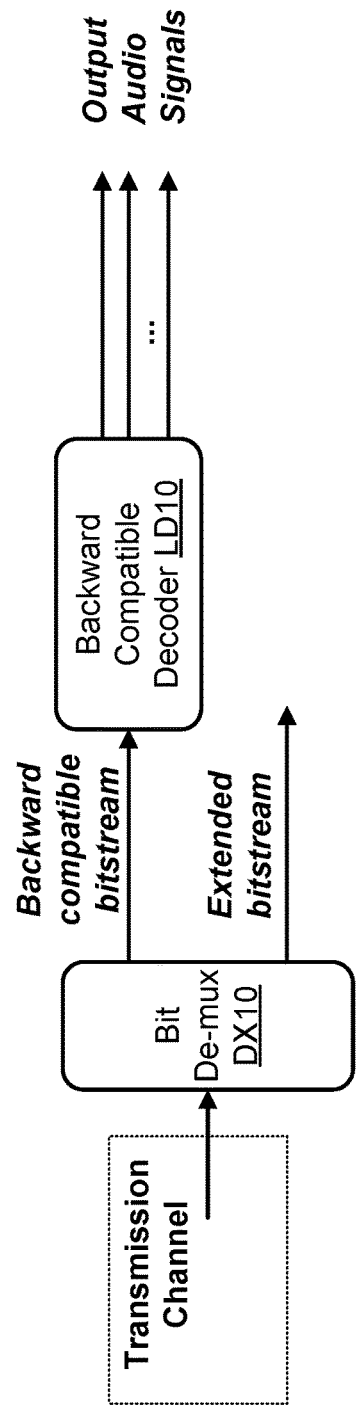
FIG. 2B shows an example of a decoding process on a conventional decoder that cannot decode scene-based data.

At the receiving end, the bitstream is demultiplexed (e.g., by demultiplexer DX10), and legacy systems that only support conventional decoders (e.g., legacy decoder LD10) would use only the backward-compatible multichannel audio content, thus retaining functionality, and ignore the extended portions of the frame-packet or bitstream as shown in FIG. 2B.

A receiver that supports scene-based decoding may perform a decoding process according to the general example shown in FIG. 3A, which is reciprocal to an encoding approach as shown in FIG. 2A. If the channels have been re-encoded or transcoded, an intermediate step of decoding may be performed. For example, a trans-decoder TC20 may be used to convert the backward compatible bitstream into multichannel audio signals. Subsequently an inverse transform matrix IM10 is used to convert the multichannel audio signals to the original subset of the hierarchical set (e.g., a basic set of SHC). The rest of the hierarchical set (e.g., an extended set of SHC) is recovered by an implementation SD20 of scene-based decoder SD10 (e.g., from an extended portion of the packet or bitstream). In this manner, the complete hierarchical set (e.g., a complete set of SHC) can be recovered and processed by the SH renderer SR10 to allow various types of sound field rendering to take place.

Using a set of SHC to represent a sound field is a particular example of a general approach of using a hierarchical set of elements to represent a sound field. A hierarchical set of elements, such as a set of SHC, is a set in which the elements are ordered such that a basic set of lower-ordered elements provides a full representation of the modeled sound field. As the set is extended to include higher-order elements, the representation of the sound field in space becomes more detailed.

The source SHC (e.g., as shown in FIG. 3A) may be source signals as mixed by mixing engineers in a scene-based-capable recording studio. The source SHC may also be generated from signals captured by a microphone array or from a recording of a sonic presentation by a surround array of loudspeakers. Conversion of a PCM stream and associated location information (e.g., an audio object) into a source set of SHC is also contemplated.

A sound field may be represented in terms of SHC using an expression such as the following:

$$p_i(t, r_r, \theta_r, \varphi_r) = \sum_{\omega=0}^{\infty} \left[ 4\pi \sum_{n=0}^{\infty} j_n(kr_r) \sum_{m=-n}^{n} A_n^m(k) Y_n^m(\theta_r, \varphi_r) \right] e^{j\omega t}, \quad (1)$$

This expression shows that the pressure $p_i$ at any point $\{r_r, \theta_r, \varphi_r\}$ of the sound field can be represented uniquely by the SHC $A_n^m(k)$. Here, the wavenumber $$k = \frac{\omega}{c},$$

c is the speed of sound (~343 m/s), $\{r_r, \theta_r, \varphi_r\}$ is a point of reference (or observation point), $j_n(\cdot)$ is the spherical Bessel function of order n, and $Y_n^m(\theta_r, \varphi_r)$ are the spherical harmonic basis functions of order n and suborder m (some descriptions of SHC label n as degree (i.e. of the corresponding Legendre polynomial) and m as order). It can be recognized that the term in square brackets is a frequency-domain representation of the signal (i.e., $S(\omega, r_r, \theta_r, \varphi_r)$) which can be approximated by various time-frequency transformations, such as the discrete Fourier transform (DFT), the discrete cosine transform (DCT), or a wavelet transform.

Figure 4:
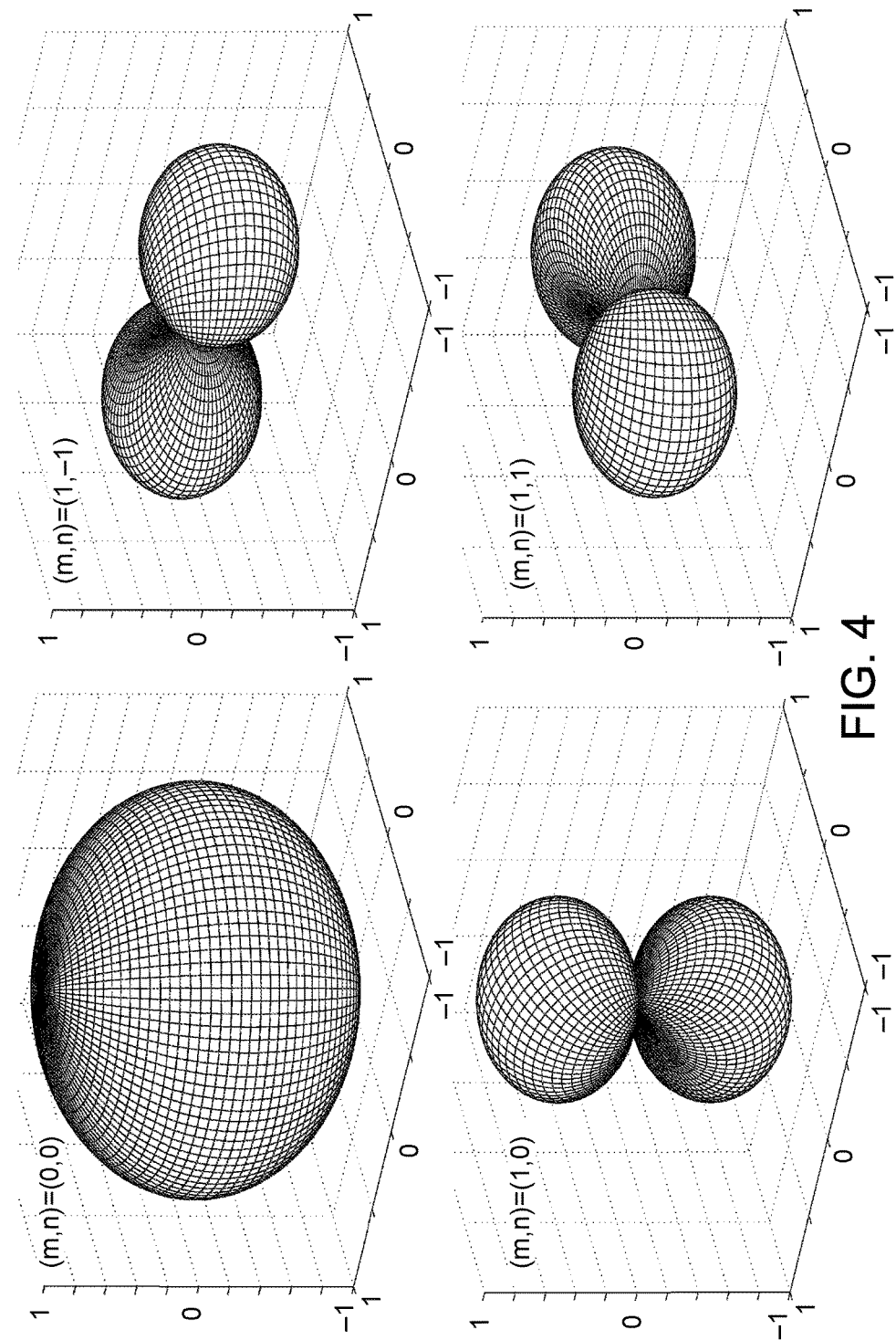
FIG. 4 shows examples of surface mesh plots of the magnitudes of spherical harmonic basis functions of order 0 and 1.

FIG. 4 shows examples of surface mesh plots of the magnitudes of spherical harmonic basis functions of order 0 and 1. The magnitude of the function $Y_0^0$ is spherical and omnidirectional. The function $Y_1^{-1}$ has positive and negative spherical lobes extending in the +y and -y directions, respectively. The function $Y_1^0$ has positive and negative spherical lobes extending in the +z and -z directions, respectively. The function $Y_1^1$ has positive and negative spherical lobes extending in the +x and -x directions, respectively.

Figure 5:
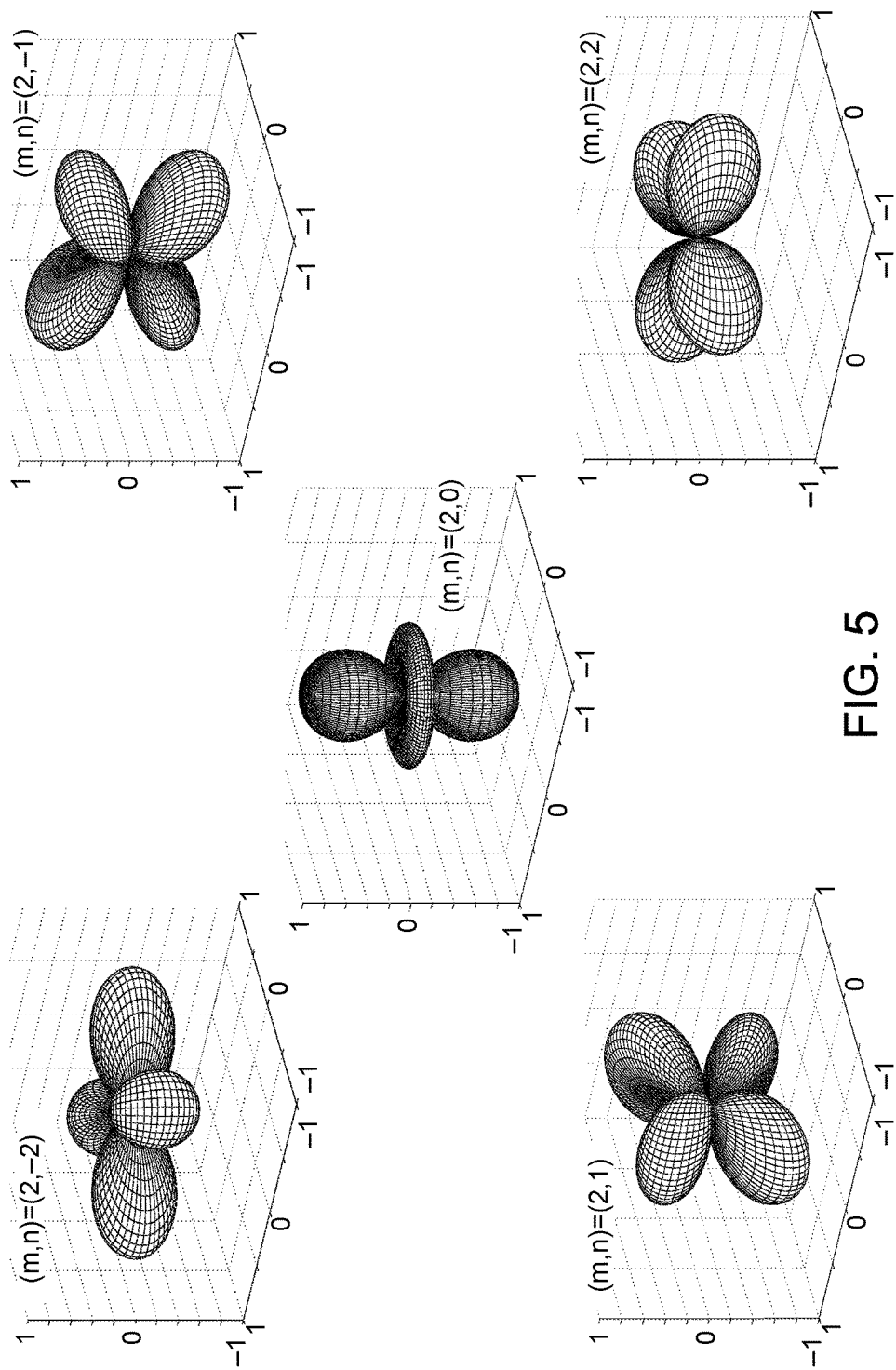
FIG. 5 shows examples of surface mesh plots of the magnitudes of spherical harmonic basis functions of order 2.

FIG. 5 shows examples of surface mesh plots of the magnitudes of spherical harmonic basis functions of order 2. The functions $Y_2^{-2}$ and $Y_2^2$ have lobes extending in the x-y plane. The function $Y_2^{-1}$ has lobes extending in the y-z plane, and the function $Y_2^1$ has lobes extending in the x-z plane. The function $Y_2^0$ has positive lobes extending in the +z and -z directions and a toroidal negative lobe extending in the x-y plane.

The total number of SHC in the set may depend on various factors. For scene-based audio, for example, the total number of SHC may be constrained by the number of microphone transducers in the recording array. For channel- and object-based audio, the total number of SHC may be determined by the available bandwidth. In one example, a fourth-order representation involving 25 coefficients (i.e., $0 \le n \le 4$, $-n \le m \le +n$) for each frequency is used. Other examples of hierarchical sets that may be used with the approach described herein include sets of wavelet transform coefficients and other sets of coefficients of multiresolution basis functions.

The SHC $A_n^m(k)$ can be derived from signals that are physically acquired (e.g., recorded) using any of various microphone array configurations, such as a tetrahedral or spherical microphone array. Input of this form represents scene-based audio input to a proposed encoder. In a non-limiting example, it is assumed that the inputs to the SHC encoder are the different output channels of a microphone array, such as an Eigenmike® (mh acoustics LLC, San Francisco, Calif.). One example of an Eigenmike® array is the em32 array, which includes 32 microphones arranged on the surface of a sphere of diameter 8.4 centimeters, such that each of the output signals $p_i(t)$, i=1 to 32, is the pressure recorded at time sample t by microphone i. Alternatively, the SHC $A_n^m(k)$ can be derived from channel-based or object-based descriptions of the sound field. For example, the coefficients $A_n^m(k)$ for the sound field corresponding to an individual audio object may be expressed as $$A_n^m(k) = g(\omega)(-4\pi i k) h_n^{(2)}(kr_s) Y_n^{m*}(\theta_s, \varphi_s), \quad (2)$$

where i is $\sqrt{-1}$, $h_n^{(2)}(\cdot)$ is the spherical Hankel function (of the second kind) of order n, $\{r_s, \theta_s, \varphi_s\}$ is the location of the object, and $g(\omega)$ is the source energy as a function of frequency.

Knowing the source energy $g(\omega)$ as a function of frequency allows us to convert each PCM object and its location into the SHC $A_n^m(k)$. This source energy may be obtained, for example, using time-frequency analysis techniques, such as by performing a fast Fourier transform (e.g., a 256-, -512-, or 1024-point FFT) on the PCM stream. Further, it can be shown (since the above is a linear and orthogonal decomposition) that the $A_n^m(k)$ coefficients for each object are additive. In this manner, a multitude of PCM objects can be represented by the $A_n^m(k)$ coefficients (e.g., as a sum of the coefficient vectors for the individual objects). Essentially, these coefficients contain information about the sound field (the pressure as a function of 3D coordinates), and the above represents the transformation from individual objects to a representation of the overall sound field, in the vicinity of the observation point $\{r_r, \theta_r, \varphi_r\}$.

One of skill in the art will recognize that representations of coefficients $A_n^m$ (or, equivalently, of corresponding time-domain coefficients $a_n^m$) other than the representation shown in expression (2) may be used, such as representations that do not include the radial component. One of skill in the art will recognize that several slightly different definitions of spherical harmonic basis functions are known (e.g., real, complex, normalized (e.g., N3D), semi-normalized (e.g., SN3D), Furse-Malham (FuMa or FMH), etc.), and consequently that expression (1) (i.e., spherical harmonic decomposition of a sound field) and expression (2) (i.e., spherical harmonic decomposition of a sound field produced by a point source) may appear in the literature in slightly different form. The present description is not limited to any particular form of the spherical harmonic basis functions and indeed is generally applicable to other hierarchical sets of elements as well.

FIG. 3B shows a flowchart of a method M100 for processing a plurality of basis function coefficients that describes a sound field during a time interval. Method M100 includes tasks T100 and T200. Task T100 performs a reversible transform on a first group (a "basic set") of the plurality of basis function coefficients to produce a plurality of channel signals, wherein each of the plurality of channel signals is associated with a corresponding different region of space. Based on the plurality of channel signals, task T200 produces a data structure that includes (A) a representation of a second group (an "extended set") of the plurality of basis function coefficients, wherein the second group is different than the first group, and (B) a representation of the plurality of channel signals that is separate from said representation of the second group.

Design of an implementation of method M100 may include selecting the subset of the original hierarchical set (i.e., the basic set) that is to be converted to multichannel audio (e.g., to a conventional format). It may be expected that such an approach would be implemented to maintain compatibility with at least the traditional 5.1 surround/home theatre capability. For the 5.1 format, the multichannel audio channels are Front Left (L), Center (C), Front Right (R), Left Surround (Ls), Right Surround (Rs), and Low Frequency Effects (LFE). The 7.1 format adds Left Back (Lb) and Right Back (Rb) channels. In the discussions below, the 5.1 format will be used as a typical target multichannel audio format, and an example approach will be elaborated. It is contemplated and hereby disclosed that the same methodology can be generalized to other multichannel audio formats (e.g., 7.1, 22.2, etc.).

Various approaches to selecting the basic set are possible. Since five signals (corresponding to full-band audio from specified locations) are available in the 5.1 format (plus the LFE signal—which has no standardized location and can be determined by lowpass filtering the five channels), one approach is to use five of the SHC to convert to the 5.1 format. Further, it may be desirable to select the basic set according to the spatial orientations of the corresponding basis functions. Since the 5.1 format is only capable of 2D rendering, for example, it may be desirable for the basic set to include only SHC which carry some horizontal information. In other words, it may be desirable to select SHC that correspond to basis functions whose energy is concentrated along at least one direction within the plane that includes the loudspeaker locations (e.g., the x-y plane). As seen in FIG. 4, the coefficient $A_1^0(k)$ carries very little information on horizontal directivity, for example, and can thus be excluded from this subset. The same is true for either the real or imaginary part of $A_2^1(k)$ (e.g., see the basis functions shown in FIG. 5 as $Y_2^1$ and $Y_2^{-1}$). The particular coefficients selected for the basic set may vary depending, for example, on the definition of the spherical harmonics basis functions chosen in the implementation (there are various definitions in the literature: real, imaginary, complex or combinations).

In such manner, five $A_n^m(k)$ coefficients can be picked for conversion. As the coefficient $A_0^0(k)$ carries the omnidirectional information, it may be desirable to always use this coefficient. Similarly, it may be desirable to include the real part of $A_1^1(k)$ and the imaginary part of $A_1^{-1}(k)$, as they carry significant horizontal directivity information. For the last two coefficients, possible candidates include the real and imaginary part of $A_2^2(k)$. Various other combinations are also possible. For example, the basic set may be selected to include only the three coefficients $A_0^0(k)$, the real part of $A_1^1(k)$, and the imaginary part of $A_1^{-1}(k)$. It is also possible for the basic set to include more or less coefficients, depending on the number of channels desired and also on the invertibility constraint on the transform matrix as discussed below.

The details of a design for 5.1 compatible systems as described herein may be adjusted accordingly for different target formats. As an example, to enable compatibility for 7.1 systems, two extra audio content channels are added to the compatible requirement, and two more SHC may be added to the basic set, so that the resulting transform matrix is square and thus may be invertible. Since the majority loudspeaker arrangement for 7.1 systems (e.g., Dolby TrueHD) are still on a horizontal plane, the selection of SHC can still exclude the ones with height information. In this way, horizontal plane signal rendering will benefit from the added loudspeaker channels in the rendering system. In a system that includes loudspeakers with height diversity (e.g., 9.1, 11.1 and 22.2 systems), it may be desirable to include SHC with height information in the basic set.

While we have generalized to multichannels, the main emphasis in the current marketplace is for 5.1 channels, as that is the 'least common denominator' to ensure functionality of legacy consumer audio systems such as set-top boxes. For a lower number of channels like stereo and mono, existing 5.1 solutions in many prior arts should be enough to cover the downmix to maintain the content information. These cases (i.e., 1.0 and 2.0) are considered trivial and are not discussed further in this disclosure.

Another issue that may arise is how much error is produced in the forward and backward conversion from the basic set (e.g., of SHC) to multichannel audio and back to the basic set. Task T100 performs a reversible transform on the basic set of the basis function coefficients to produce a plurality of channel signals, each associated with a corresponding different region of space (e.g., a corresponding different loudspeaker location). It may be desirable to implement task T100 to apply an invertible matrix to convert the basic set of SHC (e.g., the five coefficients selected as described above) into the five full-band audio signals in the 5.1 format. The desire for invertibility is to allow conversion of the five full-band audio signals back to the basic set of SHC with little or no loss of resolution.

One possible method for determining this transform matrix (e.g., matrix TM10 as shown in FIG. 2A) is an operation known as 'mode-matching.' Here, the loudspeaker feeds are computed by assuming that each loudspeaker produces a spherical wave. In such a scenario, the pressure (as a function of frequency) at a certain position r, θ, ϕ, due to the l-th loudspeaker, is given by $$P_l(\omega, r, \theta, \varphi) = g_l(\omega) \sum_{n=0}^{\infty} j_n(kr) \sum_{m=-n}^{n} (-4\pi i k) h_n^{(2)}(kr_l) Y_n^{m*}(\theta_l, \varphi_l) Y_n^m(\theta, \varphi), \quad (3)$$

where $\{r_l, \theta_l, \varphi_l\}$ represents the position of the l-th loudspeaker and $g_l(w)$ is the loudspeaker feed of the l-th speaker (in the frequency domain). The total pressure $P_t$ due to all five speakers is thus given by $$P_t(\omega, r, \theta, \varphi) = \sum_{l=1}^{5} g_l(\omega) \sum_{n=0}^{\infty} j_n(kr) \sum_{m=-n}^{n} (-4\pi i k) h_n^{(2)}(kr_l) Y_n^{m*}(\theta_l, \varphi_l) Y_n^m(\theta, \varphi). \quad (4)$$

We also know that the total pressure in terms of the five SHC is given by the equation $$P_t(\omega, r, \theta, \varphi) = 4\pi \sum_{n=0}^{\infty} j_n(kr) \sum_{m=-n}^{n} A_n^m(k) Y_n^m(\theta, \varphi). \quad (5)$$

Equating the above two equations allows us to use a transform matrix to express the loudspeaker feeds in terms of the SHC as follows:

$$\begin{bmatrix} A_0^0(\omega) \\ A_1^1(\omega) \\ A_1^{-1}(\omega) \\ A_2^2(\omega) \\ A_2^{-2}(\omega) \end{bmatrix} = \quad (6)$$

$$-ik \begin{bmatrix} h_0^{(2)}(kr_1)Y_0^{0*}(\theta_1, \varphi_1) & h_0^{(2)}(kr_2)Y_0^{0*}(\theta_2, \varphi_2) & \cdots \\ h_1^{(2)}(kr_1)Y_1^{1*}(\theta_1, \varphi_1) & \cdot & \cdots \\ \cdot & \cdot & \cdots \\ \cdot & \cdot & \cdots \\ \cdot & \cdot & \cdots \end{bmatrix} \begin{bmatrix} g_1(\omega) \\ g_2(\omega) \\ g_3(\omega) \\ g_4(\omega) \\ g_5(\omega) \end{bmatrix}.$$

This expression shows that there is a direct relationship between the five loudspeaker feeds and the chosen SHC. The transform matrix may vary depending on, for example, which coefficients were used in the subset (e.g., the basic set) and which definition of the spherical harmonic basis functions is used. In a similar manner, a transform matrix to convert from a selected basic set to a different channel format (e.g., 7.1, 22.2) may be constructed. While the above transformation matrix was derived from a 'mode matching' criteria, alternative transform matrices can be derived from other criteria as well, such as pressure matching, energy matching, etc.

While a transform matrix as in the above expression allows a conversion from loudspeaker feeds to the SHC, we would also like the matrix to be invertible such that, starting with SHC, we can work out the five channel feeds and then, at the decoder, we can optionally convert back to the SHC (when advanced (i.e., non-legacy) renderers are present). It may be desirable, for example, for the transform matrix to produce integer outputs in response to integer inputs. Various ways of manipulating the above framework to ensure invertibility of the matrix can be exploited. These include but are not limited to mathematical techniques, such as regularization techniques (e.g., frequency-dependent regularization) and various other matrix manipulation techniques that often work to ensure full rank and well-defined eigenvalues.

Figure 6:
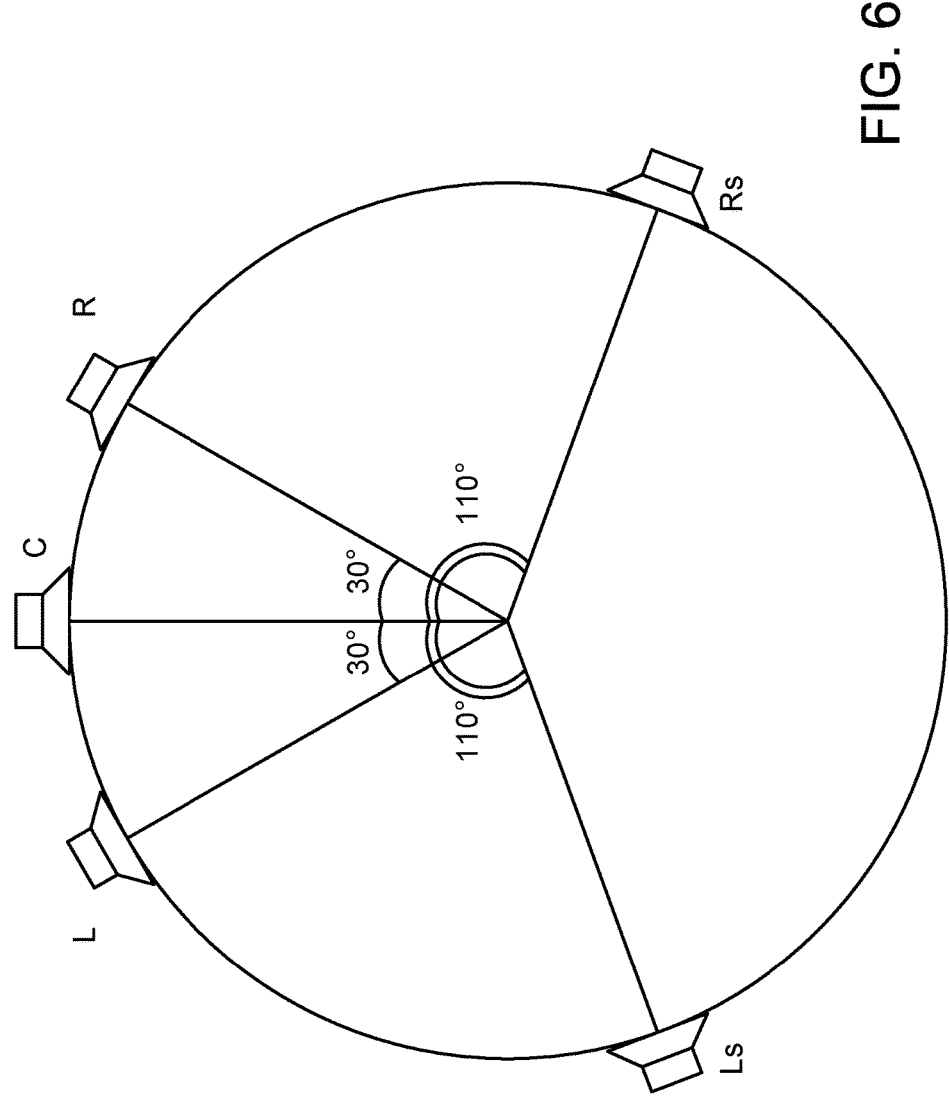
FIG. 6 shows a standard-compliant example of loudspeaker angles for a 5.1 system.

Techniques for ensuring invertibility also include but are not limited to varying the positions of one or more of the loudspeakers. Such techniques may include, for example, adjusting the positions of one or more of the five loudspeakers of a 5.1 system such that they still adhere to a specified angular tolerance (e.g., as specified by the ITU-R BS.775-1 recommendation, International Telecommunication Union, Geneva, CH). FIG. 6 shows a compliant example of loudspeaker angles for a 5.1 system that may be used. Regular spacings of the transducers, such as those adhering to the T-design, are typically well behaved.

Figure 7:
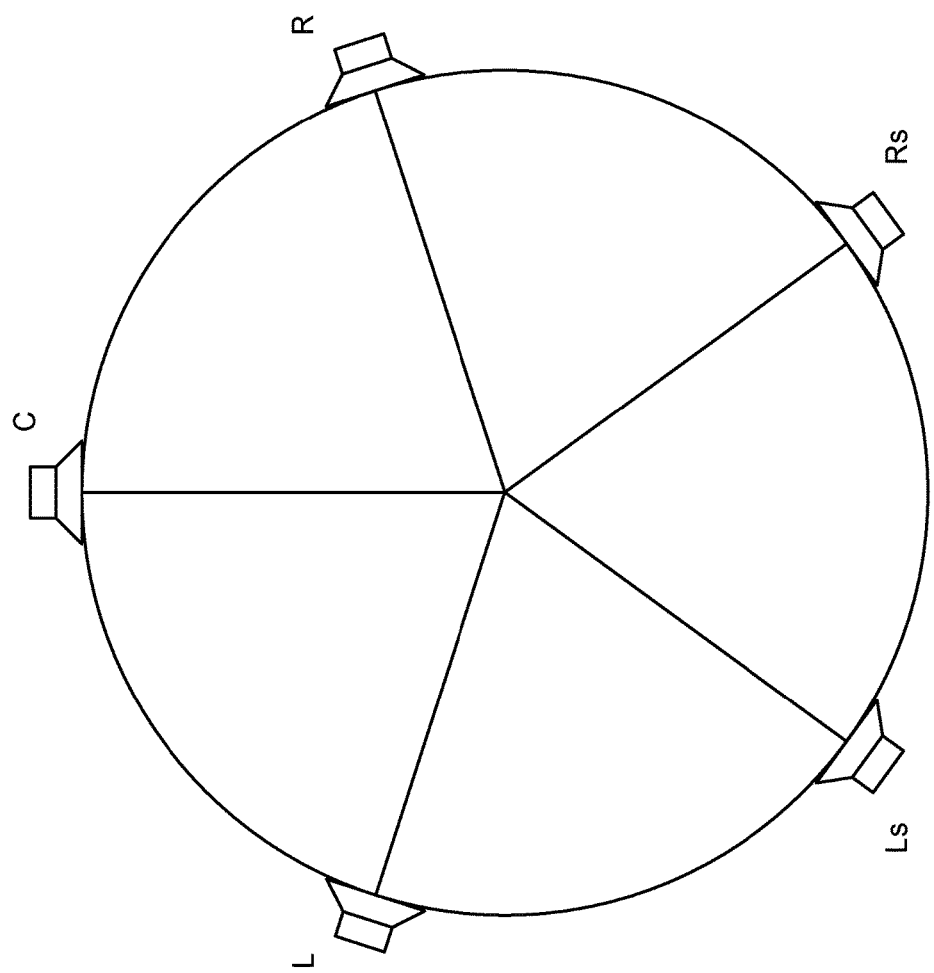
FIG. 7 shows an example of an evenly spaced arrangement of loudspeaker angles for a 5.1 target system.
Figure 8:
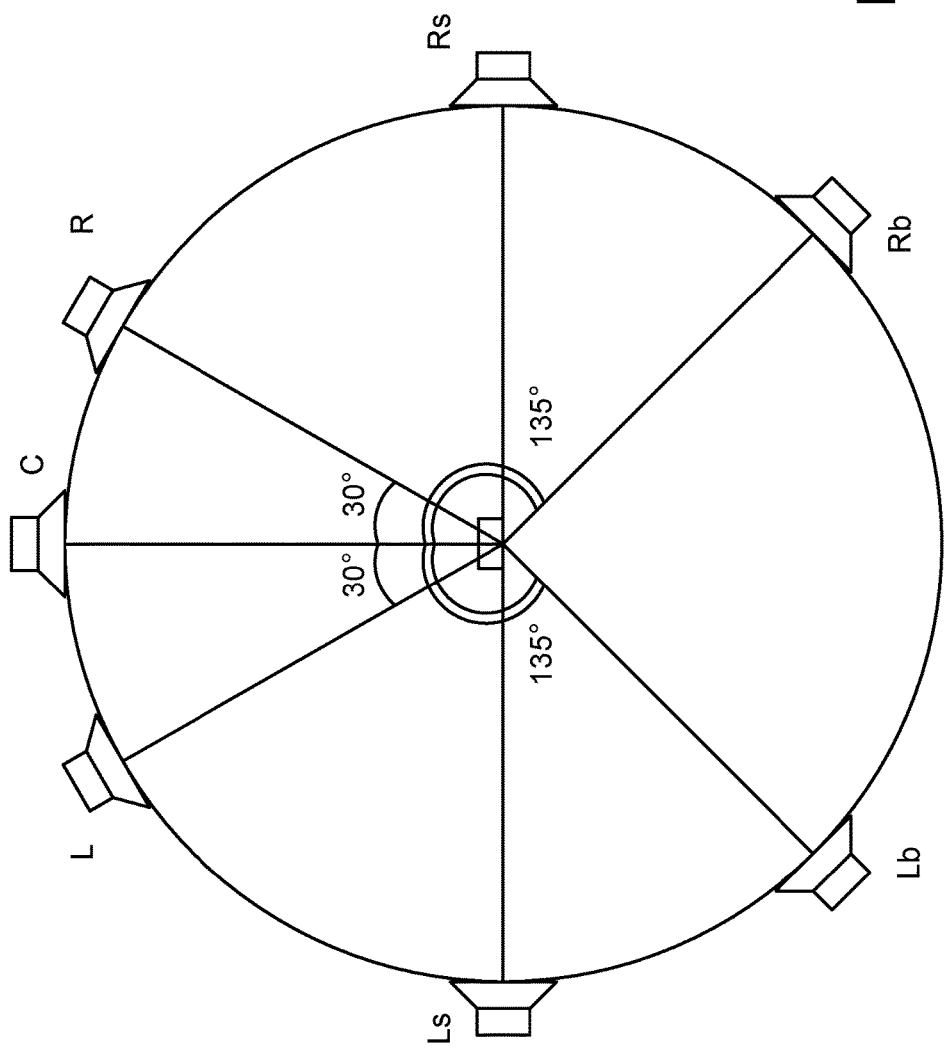
FIG. 8 shows a standard-compliant example of loudspeaker angles for a 7.1 system.
Figure 9:
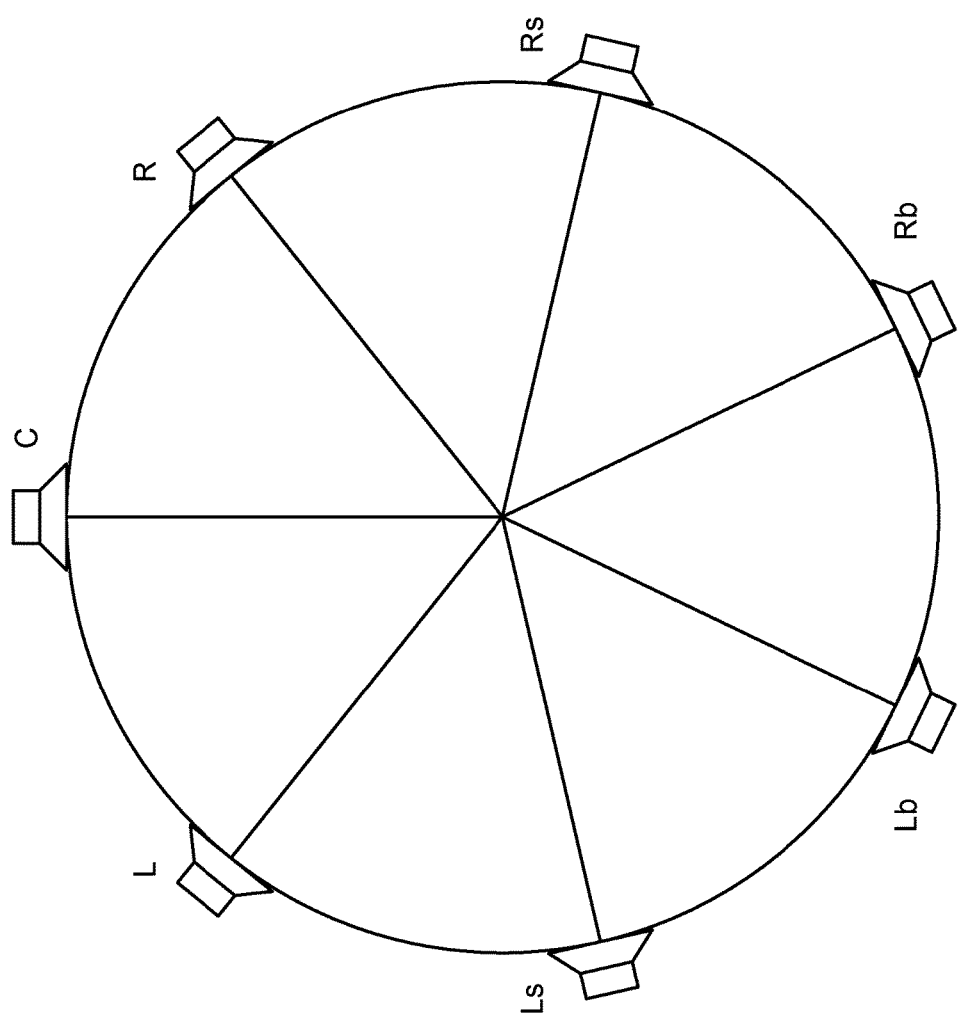
FIG. 9 shows an example of an evenly spaced arrangement of loudspeaker angles for a 7.1 target system.

Alternatively, task T100 may be implemented to apply a transform matrix that converts the basic set to a set of channel signals which correspond to loudspeaker angles that are evenly spaced in the plane. Invertibility is typically ensured for such a transform matrix. FIG. 7 shows an example of such an arrangement of loudspeaker angles for a 5.1 target system. Although such an evenly spaced arrangement may not be exactly compliant with the 5.1 standard, it still provides an appropriate backward-compatible set of loudspeaker feeds and also provides a reliable method of obtaining an invertible transform matrix for recovering the basic set of coefficients. For seven-channel implementations of task T100, FIGS. 8 and 9 show a similar example of a standard-compliant set of loudspeaker angles for a 7.1 system and a corresponding set of loudspeaker angles that are evenly spaced in the plane, respectively.

For a target channel format that includes at least one low-frequency-effects (LFE) channel, such as 5.1, 7.1, and 22.2, it may be desirable to implement method M100 to produce the set of channel signals to include such a channel as well. In one example, method M100 includes a task that produces the LFE channel by lowpass-filtering the channel signals produced by task T100 and summing the resulting lowpass signals. For a case in which multiple LFE channels are needed (e.g., left and right LFE channels for a 22.2 format), such a task may be implemented to produce these channels by summing the lowpass signals that are spatially closest to each target location. Although an LFE channel produced in this manner is redundant, it still provides a suitable signal for the legacy LFE channel, and such an approach also avoids any changes to the transform matrix.

It may be desirable to test (e.g., psycho-acoustically) the channel signals rendered by the transform matrix to ensure that after all the manipulation, the modified matrix does indeed produce correct and/or acceptable loudspeaker feeds. As long as invertibility is preserved, the inverse problem of ensuring correct decoding to the SHC is typically not an issue. It is typically sufficient that a matrix can be derived that allows the transformation between the basic set (e.g., SHC subset) and traditional multichannel audio and also that after manipulation (that does not reduce the fidelity of the multichannel audio), a slightly modified matrix can also be formulated that is also invertible.

Based on the plurality of channel signals, task T200 produces a data structure that includes (A) a representation of a second group of the plurality of basis function coefficients (e.g., an "extended set"), wherein the second group is different than the first group, and (B) a representation of the plurality of channel signals that is separate from said representation of the second group. The data structure may be a structure in time (e.g., including one or more live bitstreams or streams of packets) and/or a structure in space (e.g., including one or more bitstreams stored on a storage medium, or one or more packets stored in a buffer).

As shown in expression (6), task T100 may be implemented to apply the transform matrix to the basic set at each frequency to produce the channel signals in a frequency domain. Method M100 may be implemented to include a task that performs an inverse frequency transform (e.g., an inverse FFT) on each of these frequency-domain channel signals to produce a corresponding time-domain channel signal (e.g., a linear PCM stream).

The channel signals may be carried as linear PCM streams by an HDMI interface (High-Definition Multimedia Interface, HDMI Licensing, LLC, Sunnyvale, Calif.). In another example, the channel signals may be stored as linear PCM streams on an optical disc, such as a CD, DVD, DVD-Audio, or Blu-Ray disc. A Blu-Ray disc (e.g., an optical data storage medium compliant with the Blu-Ray Disc Application Definition BD-J, March 2005, Blu-Ray Disc Association, www-dot-blu-raydisc-dot-com) may include a file 'zzzzz.m2ts' that contains an MPEG-2 transport stream, where 'zzzzz' is a five-digit number that associates the AV stream file with a clip information file. The stream file 'zzzzz.m2ts' may include multiple elementary audio streams. Task T200 may be implemented to produce such a stream file that includes time-domain versions of the channel signals produced by task T100 as LPCM streams.

To reduce use of bandwidth and/or storage resources, it may be desirable to implement task T200 to compress the LPCM channel streams. To ensure recoverability of the basic set of SHC, it may be desirable to perform such compression using a lossless compression scheme. In one example, task T200 is implemented to encode the PCM streams using Meridian Lossless Packing (MLP) to produce a bitstream that is compliant with the DVD-Audio. In another example, task T200 is implemented to encode the PCM streams using the MPEG-4 SLS (Scalable to Lossless) lossless extension to the AAC core codec. In a further example, task T200 is implemented to produce a stream file (e.g., a Blu-Ray-compliant m2ts file as described above) that includes elementary audio streams produced by losslessly encoding the PCM streams using Dolby TrueHD, which encodes 7.1 audio using an improved version of MLP, and/or DTS-HD Master Audio (DTS, Inc., Calabasas, Calif.), which also encodes 7.1 audio with a lossless option.

Task T200 may be otherwise implemented to encode the channel signals into backward-compatible coded signals that describe the channel signals (e.g., as illustrated in FIG. 2A by the operation of transcoder TC10). Such encoding may include performing a lossy compression scheme on the channel signals. Examples of backward-compatible codecs that may be used in such implementations of task T200 include AC3 (e.g., as described in ATSC Standard: Digital Audio Compression, Doc. A/52:2012, 23 March 2012, Advanced Television Systems Committee, Washington, D.C.; also called ATSC A/52 or Dolby Digital, which uses lossy MDCT compression), Dolby TrueHD (which includes lossy compression options), DTS-HD Master Audio (which also includes lossy compression options), and MPEG Surround (MPS, ISO/IEC 14496-3, also called High-Efficiency Advanced Audio Coding or HeAAC, in which the six channels of a 5.1 format signal are downmixed into a mono or stereo PCM stream, with corresponding side-information, such as interaural level difference, interaural time difference, and inter-channel coherence, that allows the synthesis of the rest of the channels at the renderer). These codecs typically accept time-domain channel signals (e.g., a set of linear PCM streams) as input. Such transcoding allows the channel signals to retain backward compatibility with AC3 decoders that are in many consumer devices and set-top boxes. For example, the encoded channels may be packed into a corresponding portion of a packet that is compliant with a desired corresponding channel-based format.

In such cases, method M100 may be implemented to encode the rest of the hierarchical set (e.g., the SHC that were not part of the subset) separately for transmission (and/or storage) in one or more extended portions of the transcoded bitstream (e.g., an "auxdata" portion of an AC3 packet). Such an operation is illustrated in FIG. 2A, for example, by the operation of bitstream multiplexer MX10. It is also possible for such an implementation of method M100 to include two or more different transcoding operations, each coding the multichannel signal into a different respective format (e.g., an AC3 transcoding and a Dolby TrueHD transcoding), to produce two different backward-compatible bitstreams for transmission and/or storage.

As noted above, a Dolby Digital Plus bitstream includes a core (A) packet with a 5.1 mix and an extension (B) packet with four surround channels of a 7.1 mix. An implementation of method M100 for compatibility with such a codec may include an implementation of task T100 configured to transform a basic set of seven SHC (for each frequency) into seven channels for encoding into such A and B packets. In such case, task T200 may be implemented to include the eighth and higher SHC in the extended set or, alternatively, to include the sixth and higher SHC in the extended set, where the extended set may be encoded into one or more further extension packets.

It may be desirable to implement task T200 to produce packets that correspond to time intervals of different lengths. For example, a shorter interval may be used to encode transient events in the audio input, while a longer interval may be used to encode stationary signals. In one such example, task T200 is implemented to encode a constant time interval in the PCM channels for backward compatibility, but to encode different interval lengths into the extended set. In another such example, task T200 is implemented to encode intervals of different lengths into the PCM streams, along with an indication of the duration of the corresponding time interval. For a case in which AC-3 coding is used, for example, task T200 may be implemented to switch between the two block length options of 256 and 512 samples.

As illustrated in FIG. 2A, the extended set of coefficients may be encoded before being associated (e.g., multiplexed) with the encoded channel signals for transmission and/or storage. Such encoding may include bandwidth compression. For example, the extended set may be encoded (e.g., by encoder SE20) by applying one or more lossy or lossless coding techniques, such as quantization (e.g., into one or more codebook indices), error correction coding, redundancy coding, etc., and/or packetization. Additionally or alternatively, such encoding may include encoding into an Ambisonic format, such as B-format, G-format, or Higher-order Ambisonics (HOA). In one example, the extended set of coefficients are encoded into HOA B-format and then the B-format signals are encoded using Advanced Audio Coding (AAC; e.g., as defined in ISO/IEC 14496-3:2009, "Information technology—Coding of audio-visual objects—Part 3: Audio," Int'l Org. for Standardization, Geneva, CH). Descriptions of other methods for encoding sets of SHC that may be performed on the extended set (e.g., by encoder SE20) may be found, for example, in U.S. Publ. Pat. Appls. Nos. 2012/0155653 A1 (Jax et al.) and 2012/0314878 A1 (Daniel et al.). The extended set of coefficients may be encoded, for example, as differences between coefficients of different orders and/or differences between coefficients of the same order at different times.

It may be desirable to implement MPEG encoder MP10 as shown in FIG. 1B to perform an implementation of method M100 as described herein (e.g., to produce a bitstream for streaming, broadcast, multicast, storage, and/or media mastering (for example, mastering of CD, DVD, and/or Blu-Ray™ Disc)).

Figure 10B:
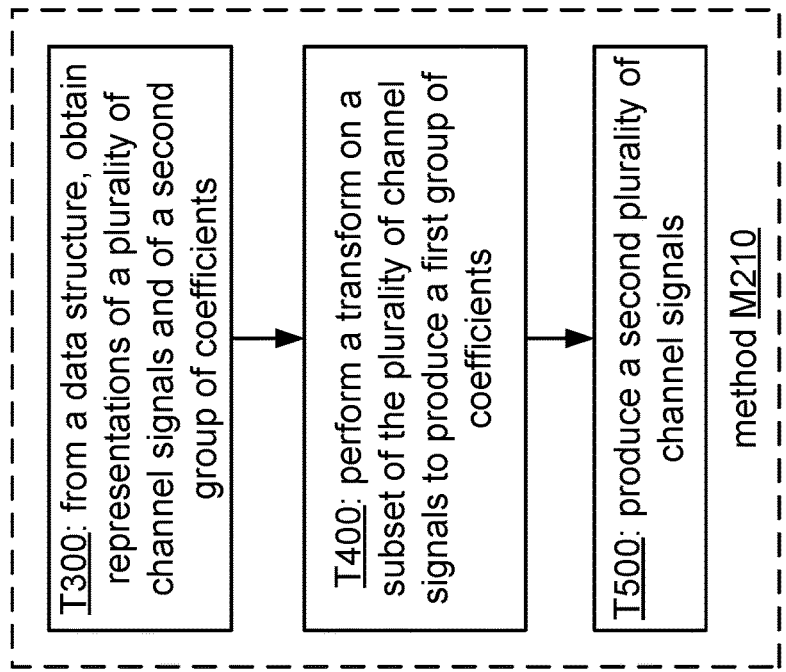
FIG. 10B shows a flowchart of an implementation M210 of method M200.
Figure 10A:
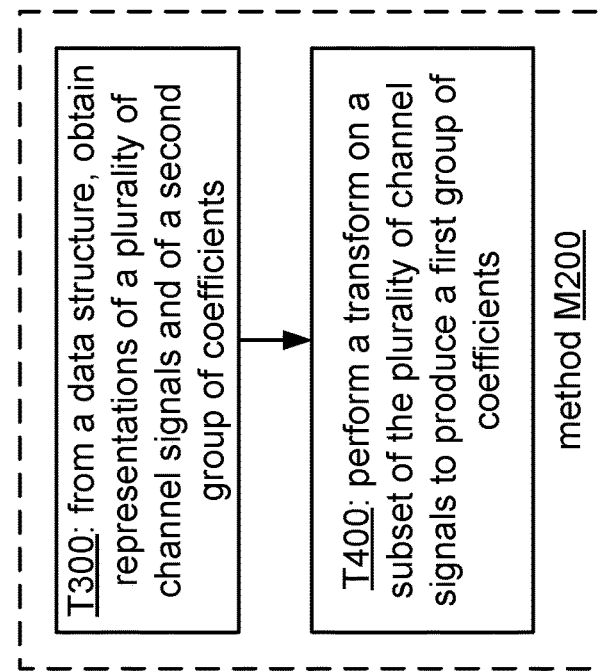
FIG. 10A shows a flowchart of a method of audio signal processing M200 according to a general configuration.

Obtaining the complete set of basis function coefficients from the backward-compatible data structure may be performed in an analogous manner, by removing any intervening coding layers and/or domain transforms (e.g., via demultiplexer DX10, trans-decoder TC20, and scene-based decoder SD20) to obtain the channel signals and then applying an inverse of the reversible transform described above (e.g., matrix IM10 as shown in FIG. 3A) to the channel signals. FIG. 10A shows a flowchart of a method M200, according to a general configuration, of obtaining a plurality of basis function coefficients that describes a sound field during a time interval. As described above, each of the plurality of basis function coefficients may correspond to a unique one of a set of orthogonal basis functions (e.g., to a unique one of a set of spherical harmonic basis functions).

Method M200 includes tasks T300 and T400. From a data structure, task T300 obtains (A) a representation of a second group (the "extended set") of the plurality of basis function coefficients and (B) a representation of a plurality of channel signals that is separate from said representation of the second group. Each of a subset of the plurality of channel signals is associated with a corresponding different region of space (e.g., the coplanar directions of a 5.1 or 7.1 format), while the plurality of channel signals may also include one or more non-directional (or omnidirectional) signals, such as LFE channels. It may be desirable to implement task T300 to perform an FFT on a set of LPCM streams to obtain the subset of the plurality of channel signals in the frequency domain. Task T400 performs a transform on the subset of the plurality of channel signals to produce a first group (the "basic set") of the plurality of basis function coefficients, wherein the first group is different than the second group. It may be desirable to execute method M200 only upon detecting that a representation of an extended set of coefficients is present in the data structure, and otherwise to render the channel signals in the backward-compatible manner (e.g., as loudspeaker feeds) without transforming them into a basic set of coefficients.

Method M200 may be implemented to render the complete set of basis function coefficients to a loudspeaker geometry that is different than the one associated with the plurality of channel signals from which the basic set was recovered. FIG. 10B shows a flowchart of such an implementation M210 of method M200 that includes a task T500. Based on the plurality of basis function coefficients, task T500 produces a second plurality of channel signals. In this case, each signal of the subset of the plurality of channel signals is associated with a corresponding different one of a set of coplanar directions, while each of the second plurality of channel signals is associated with a corresponding different one of a set of directions that span a three-dimensional space. For example, the second plurality of channel signals may include one or more channels that correspond to loudspeaker locations that are above the reference plane or that otherwise provide height information. In one example, task T500 is implemented to apply a rendering matrix for a particular loudspeaker geometry that is obtained in an analogous manner to derivation of the transform matrix for converting the basic set of coefficients to the backward-compatible channel signals as described above (e.g., with reference to expressions (3)-(6), but typically without any invertibility constraint).

The above thus represents a lossless mechanism to convert between a hierarchical set of elements (e.g., a set of SHC) and multiple audio channels. No errors are incurred as long as the multichannel audio signals are not subjected to further coding noise. In case they are subjected to coding noise (e.g., via a lossy compression operation), the conversion to SHC may incur errors. However, it is possible to account for these errors by monitoring the values of the coefficients and taking appropriate action to reduce their effect. These methods may take into account characteristics of the SHC, including the inherent redundancy in the SHC representation.

FIG. 3C shows a block diagram of an apparatus MF100 for processing a plurality of basis function coefficients that describes a sound field during a time interval. Apparatus MF100 includes means F100 for performing a reversible transform on a first group (a "basic set") of the plurality of basis function coefficients to produce a plurality of channel signals, wherein each of the plurality of channel signals is associated with a corresponding different region of space (e.g., as described herein with reference to implementations of task T100 and transform matrix TM10). Apparatus MF100 also includes means F200 for producing a data structure, based on the plurality of channel signals, that includes (A) a representation of a second group (an "extended set") of the plurality of basis function coefficients, wherein the second group is different than the first group, and (B) a representation of the plurality of channel signals that is separate from said representation of the second group (e.g., as described herein with reference to implementations of task T200, transcoder TC10, encoder SE20, and multiplexer MX10).

FIG. 3D shows a block diagram of an apparatus A100 for processing a plurality of basis function coefficients that describes a sound field during a time interval. Apparatus A100 includes a calculator 100 configured to perform a reversible transform on a first group (a "basic set") of the plurality of basis function coefficients to produce a plurality of channel signals, wherein each of the plurality of channel signals is associated with a corresponding different region of space (e.g., as described herein with reference to implementations of task T100 and transform matrix TM10). Apparatus A100 also includes a data formatter 200 configured to produce a data structure, based on the plurality of channel signals, that includes (A) a representation of a second group (an "extended set") of the plurality of basis function coefficients, wherein the second group is different than the first group, and (B) a representation of the plurality of channel signals that is separate from said representation of the second group (e.g., as described herein with reference to implementations of task T200, transcoder TC10, encoder SE20, and multiplexer MX10). Formatter 200 may include a packetizer.

FIG. 11A shows a block diagram of an apparatus MF200, according to a general configuration, for obtaining a plurality of basis function coefficients that describes a sound field during a time interval. Apparatus MF200 includes means F300 for obtaining, from a data structure, (A) a representation of a second group (the "extended set") of the plurality of basis function coefficients and (B) a representation of a plurality of channel signals that is separate from said representation of the second group (e.g., as described herein with reference to implementations of task T300, demultiplexer DX10, transcoder TC20, and decoder SD20). Apparatus MF200 also includes means F400 for performing a transform on the subset of the plurality of channel signals to produce a first group (the "basic set") of the plurality of basis function coefficients, wherein the first group is different than the second group (e.g., as described herein with reference to implementations of task T400 and inverse transform matrix IM10). FIG. 11B shows a flowchart of an implementation MF210 of apparatus MF200 that includes means F500 for producing a second plurality of channel signals based on the plurality of basis function coefficients (e.g., as described herein with reference to implementations of task T500 and renderer SR10).

FIG. 11C shows a block diagram of an apparatus A200, according to a general configuration, for obtaining a plurality of basis function coefficients that describes a sound field during a time interval. Apparatus A200 includes a data extractor 300 configured to obtain, from a data structure, (A) a representation of a second group (the "extended set") of the plurality of basis function coefficients and (B) a representation of a plurality of channel signals that is separate from said representation of the second group (e.g., as described herein with reference to implementations of task T300, demultiplexer DX10, transcoder TC20, and decoder SD20). Extractor 300 may include a depacketizer. Apparatus A200 also includes a calculator 400 configured to perform a transform on the subset of the plurality of channel signals to produce a first group (the "basic set") of the plurality of basis function coefficients, wherein the first group is different than the second group (e.g., as described herein with reference to implementations of task T400 and inverse transform matrix IM10). FIG. 11D shows a flowchart of an implementation A210 of apparatus A200 that includes a renderer 500 configured to produce a second plurality of channel signals based on the plurality of basis function coefficients (e.g., as described herein with reference to implementations of task T500 and renderer SR10).

In a further example, method M100 is implemented to include a task that combines two or more sets of basis function coefficients, where each set describes a corresponding sound field during a corresponding time interval, and provides the combined set as the input to task T100. For example, such a task may be implemented to add the plurality of sets of coefficients (e.g., to perform coefficient vector addition of SHC vectors) to produce a description of a combined sound field. Each set of basis function coefficients may represent, for example, an audio object. A set of such basis function coefficients (e.g., SHC vector for one object) may have a higher order (e.g., a longer length) than another set of basis function coefficients (e.g., for another of the objects). For example, an object in the foreground (e.g., the voice of a leading actor) may be represented with a higher-order set than an object in the background (e.g., a sound effect).

FIG. 11E shows a block diagram for an apparatus P100 according to a general configuration. Apparatus P100 includes a processor P10 configured to perform an implementation of method M100 as described herein on a plurality of basis function coefficients that describes a sound field during a time interval to produce a corresponding data structure. Apparatus P100 also includes a memory ME10 configured to store the data structure produced by processor P10.

It may be desirable to perform a method as described herein (e.g., method M100 or M200) within a portable audio sensing device that has an array of two or more microphones configured to receive acoustic signals. Examples of a portable audio sensing device that may be implemented to include such an array and may be used for audio recording and/or voice communications applications include a telephone handset (e.g., a cellular telephone handset); a wired or wireless headset (e.g., a Bluetooth headset); a handheld audio and/or video recorder (e.g., a camcorder); a personal media player configured to record audio and/or video content; a personal digital assistant (PDA) or other handheld computing device; and a notebook computer, laptop computer, netbook computer, tablet computer, or other portable computing device.

The methods and apparatus disclosed herein may be applied generally in any transceiving and/or audio sensing application, including mobile or otherwise portable instances of such applications and/or sensing of signal components from far-field sources. For example, the range of configurations disclosed herein includes communications devices that reside in a wireless telephony communication system configured to employ a code-division multiple-access (CDMA) over-the-air interface. Nevertheless, it would be understood by those skilled in the art that a method and apparatus having features as described herein may reside in any of the various communication systems employing a wide range of technologies known to those of skill in the art, such as systems employing Voice over IP (VoIP) over wired and/or wireless (e.g., CDMA, TDMA, FDMA, and/or TD-SCDMA) transmission channels.

It is expressly contemplated and hereby disclosed that communications devices disclosed herein (e.g., smartphones, tablet computers) may be adapted for use in networks that are packet-switched (for example, wired and/or wireless networks arranged to carry audio transmissions according to protocols such as VoIP) and/or circuit-switched. It is also expressly contemplated and hereby disclosed that communications devices disclosed herein may be adapted for use in narrowband coding systems (e.g., systems that encode an audio frequency range of about four or five kilohertz) and/or for use in wideband coding systems (e.g., systems that encode audio frequencies greater than five kilohertz), including whole-band wideband coding systems and split-band wideband coding systems.

The foregoing presentation of the described configurations is provided to enable any person skilled in the art to make or use the methods and other structures disclosed herein. The flowcharts, block diagrams, and other structures shown and described herein are examples only, and other variants of these structures are also within the scope of the disclosure. Various modifications to these configurations are possible, and the generic principles presented herein may be applied to other configurations as well. Thus, the present disclosure is not intended to be limited to the configurations shown above but rather is to be accorded the widest scope consistent with the principles and novel features disclosed in any fashion herein, including in the attached claims as filed, which form a part of the original disclosure.

Those of skill in the art will understand that information and signals may be represented using any of a variety of different technologies and techniques. For example, data, instructions, commands, information, signals, bits, and symbols that may be referenced throughout the above description may be represented by voltages, currents, electromagnetic waves, magnetic fields or particles, optical fields or particles, or any combination thereof.

Important design requirements for implementation of a configuration as disclosed herein may include minimizing processing delay and/or computational complexity (typically measured in millions of instructions per second or MIPS), especially for computation-intensive applications, such as playback of compressed audio or audiovisual information (e.g., a file or stream encoded according to a compression format, such as one of the examples identified herein) or applications for wideband communications (e.g., voice communications at sampling rates higher than eight kilohertz, such as 12, 16, 44.1, 48, or 192 kHz).

Goals of a multi-microphone processing system may include achieving ten to twelve dB in overall noise reduction, preserving voice level and color during movement of a desired speaker, obtaining a perception that the noise has been moved into the background instead of an aggressive noise removal, dereverberation of speech, and/or enabling the option of post-processing for more aggressive noise reduction.

An apparatus as disclosed herein (e.g., any of apparatus A100, A200, A210, MF100, MF200, MF210, and P100) may be implemented in any combination of hardware with software, and/or with firmware, that is deemed suitable for the intended application. For example, the elements of such an apparatus may be fabricated as electronic and/or optical devices residing, for example, on the same chip or among two or more chips in a chipset. One example of such a device is a fixed or programmable array of logic elements, such as transistors or logic gates, and any of these elements may be implemented as one or more such arrays. Any two or more, or even all, of the elements of the apparatus may be implemented within the same array or arrays. Such an array or arrays may be implemented within one or more chips (for example, within a chipset including two or more chips).

One or more elements of the various implementations of the apparatus disclosed herein (e.g., any of apparatus A100, A200, A210, MF100, MF200, MF210, and P100) may also be implemented in whole or in part as one or more sets of instructions arranged to execute on one or more fixed or programmable arrays of logic elements, such as microprocessors, embedded processors, IP cores, digital signal processors, FPGAs (field-programmable gate arrays), ASSPs (application-specific standard products), and ASICs (application-specific integrated circuits). Any of the various elements of an implementation of an apparatus as disclosed herein may also be embodied as one or more computers (e.g., machines including one or more arrays programmed to execute one or more sets or sequences of instructions, also called "processors"), and any two or more, or even all, of these elements may be implemented within the same such computer or computers.

A processor or other means for processing as disclosed herein (e.g., processor P10) may be fabricated as one or more electronic and/or optical devices residing, for example, on the same chip or among two or more chips in a chipset. One example of such a device is a fixed or programmable array of logic elements, such as transistors or logic gates, and any of these elements may be implemented as one or more such arrays. Such an array or arrays may be implemented within one or more chips (for example, within a chipset including two or more chips). Examples of such arrays include fixed or programmable arrays of logic elements, such as microprocessors, embedded processors, IP cores, DSPs, FPGAs, ASSPs, and ASICs. A processor or other means for processing as disclosed herein may also be embodied as one or more computers (e.g., machines including one or more arrays programmed to execute one or more sets or sequences of instructions) or other processors. It is possible for a processor as described herein to be used to perform tasks or execute other sets of instructions that are not directly related to an audio coding procedure as described herein, such as a task relating to another operation of a device or system in which the processor is embedded (e.g., an audio sensing device). It is also possible for part of a method as disclosed herein to be performed by a processor of the audio sensing device and for another part of the method to be performed under the control of one or more other processors.

Those of skill will appreciate that the various illustrative modules, logical blocks, circuits, and tests and other operations described in connection with the configurations disclosed herein may be implemented as electronic hardware, computer software, or combinations of both. Such modules, logical blocks, circuits, and operations may be implemented or performed with a general purpose processor, a digital signal processor (DSP), an ASIC or ASSP, an FPGA or other programmable logic device, discrete gate or transistor logic, discrete hardware components, or any combination thereof designed to produce the configuration as disclosed herein. For example, such a configuration may be implemented at least in part as a hard-wired circuit, as a circuit configuration fabricated into an application-specific integrated circuit, or as a firmware program loaded into non-volatile storage or a software program loaded from or into a data storage medium as machine-readable code, such code being instructions executable by an array of logic elements such as a general purpose processor or other digital signal processing unit. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. A software module may reside in a non-transitory storage medium such as RAM (random-access memory), ROM (read-only memory), nonvolatile RAM (NVRAM) such as flash RAM, erasable programmable ROM (EPROM), electrically erasable programmable ROM (EEPROM), registers, hard disk, a removable disk, or a CD-ROM; or in any other form of storage medium known in the art. An illustrative storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

It is noted that the various methods disclosed herein (e.g., any of methods M100, M200, and M210) may be performed by an array of logic elements such as a processor, and that the various elements of an apparatus as described herein may be implemented as modules designed to execute on such an array. As used herein, the term "module" or "sub-module" can refer to any method, apparatus, device, unit or computer-readable data storage medium that includes computer instructions (e.g., logical expressions) in software, hardware or firmware form. It is to be understood that multiple modules or systems can be combined into one module or system and one module or system can be separated into multiple modules or systems to perform the same functions. When implemented in software or other computer-executable instructions, the elements of a process are essentially the code segments to perform the related tasks, such as with routines, programs, objects, components, data structures, and the like. The term "software" should be understood to include source code, assembly language code, machine code, binary code, firmware, macrocode, microcode, any one or more sets or sequences of instructions executable by an array of logic elements, and any combination of such examples. The program or code segments can be stored in a processor-readable storage medium or transmitted by a computer data signal embodied in a carrier wave over a transmission medium or communication link.

The implementations of methods, schemes, and techniques disclosed herein may also be tangibly embodied (for example, in one or more computer-readable media as listed herein) as one or more sets of instructions readable and/or executable by a machine including an array of logic elements (e.g., a processor, microprocessor, microcontroller, or other finite state machine). The term "computer-readable medium" may include any medium that can store or transfer information, including volatile, nonvolatile, removable and non-removable media. Examples of a computer-readable medium include an electronic circuit, a semiconductor memory device, a ROM, a flash memory, an erasable ROM (EROM), a floppy diskette or other magnetic storage, a CD-ROM/DVD or other optical storage, a hard disk, a fiber optic medium, a radio frequency (RF) link, or any other medium which can be used to store the desired information and which can be accessed. The computer data signal may include any signal that can propagate over a transmission medium such as electronic network channels, optical fibers, air, electromagnetic, RF links, etc. The code segments may be downloaded via computer networks such as the Internet or an intranet. In any case, the scope of the present disclosure should not be construed as limited by such embodiments.

Each of the tasks of the methods described herein may be embodied directly in hardware, in a software module executed by a processor, or in a combination of the two. In a typical application of an implementation of a method as disclosed herein, an array of logic elements (e.g., logic gates) is configured to perform one, more than one, or even all of the various tasks of the method. One or more (possibly all) of the tasks may also be implemented as code (e.g., one or more sets of instructions), embodied in a computer program product (e.g., one or more data storage media such as disks, flash or other nonvolatile memory cards, semiconductor memory chips, etc.), that is readable and/or executable by a machine (e.g., a computer) including an array of logic elements (e.g., a processor, microprocessor, microcontroller, or other finite state machine). The tasks of an implementation of a method as disclosed herein may also be performed by more than one such array or machine. In these or other implementations, the tasks may be performed within a device for wireless communications such as a cellular telephone or other device having such communications capability. Such a device may be configured to communicate with circuit-switched and/or packet-switched networks (e.g., using one or more protocols such as VoIP). For example, such a device may include RF circuitry configured to receive and/or transmit encoded frames.

It is expressly disclosed that the various methods disclosed herein may be performed by a portable communications device such as a handset, headset, or portable digital assistant (PDA), and that the various apparatus described herein may be included within such a device. A typical real-time (e.g., online) application is a telephone conversation conducted using such a mobile device.

In one or more exemplary embodiments, the operations described herein may be implemented in hardware, software, firmware, or any combination thereof. If implemented in software, such operations may be stored on or transmitted over a computer-readable medium as one or more instructions or code. The term "computer-readable media" includes both computer-readable storage media and communication (e.g., transmission) media. By way of example, and not limitation, computer-readable storage media can comprise an array of storage elements, such as semiconductor memory (which may include without limitation dynamic or static RAM, ROM, EEPROM, and/or flash RAM), or ferroelectric, magnetoresistive, ovonic, polymeric, or phase-change memory; CD-ROM or other optical disk storage; and/or magnetic disk storage or other magnetic storage devices. Such storage media may store information in the form of instructions or data structures that can be accessed by a computer. Communication media can comprise any medium that can be used to carry desired program code in the form of instructions or data structures and that can be accessed by a computer, including any medium that facilitates transfer of a computer program from one place to another. Also, any connection is properly termed a computer-readable medium. For example, if the software is transmitted from a website, server, or other remote source using a coaxial cable, fiber optic cable, twisted pair, digital subscriber line (DSL), or wireless technology such as infrared, radio, and/or microwave, then the coaxial cable, fiber optic cable, twisted pair, DSL, or wireless technology such as infrared, radio, and/or microwave are included in the definition of medium. Disk and disc, as used herein, includes compact disc (CD), laser disc, optical disc, digital versatile disc (DVD), floppy disk and Blu-ray Disc™ (Blu-Ray Disc Association, Universal City, Calif.), where disks usually reproduce data magnetically, while discs reproduce data optically with lasers. Combinations of the above should also be included within the scope of computer-readable media.

An acoustic signal processing apparatus as described herein (e.g., apparatus A100 or MF100) may be incorporated into an electronic device that accepts speech input in order to control certain operations, or may otherwise benefit from separation of desired noises from background noises, such as communications devices. Many applications may benefit from enhancing or separating clear desired sound from background sounds originating from multiple directions. Such applications may include human-machine interfaces in electronic or computing devices which incorporate capabilities such as voice recognition and detection, speech enhancement and separation, voice-activated control, and the like. It may be desirable to implement such an acoustic signal processing apparatus to be suitable in devices that only provide limited processing capabilities.

The elements of the various implementations of the modules, elements, and devices described herein may be fabricated as electronic and/or optical devices residing, for example, on the same chip or among two or more chips in a chipset. One example of such a device is a fixed or programmable array of logic elements, such as transistors or gates. One or more elements of the various implementations of the apparatus described herein may also be implemented in whole or in part as one or more sets of instructions arranged to execute on one or more fixed or programmable arrays of logic elements such as microprocessors, embedded processors, IP cores, digital signal processors, FPGAs, ASSPs, and ASICs.

It is possible for one or more elements of an implementation of an apparatus as described herein to be used to perform tasks or execute other sets of instructions that are not directly related to an operation of the apparatus, such as a task relating to another operation of a device or system in which the apparatus is embedded. It is also possible for one or more elements of an implementation of such an apparatus to have structure in common (e.g., a processor used to execute portions of code corresponding to different elements at different times, a set of instructions executed to perform tasks corresponding to different elements at different times, or an arrangement of electronic and/or optical devices performing operations for different elements at different times).

What is claimed is:

1. A device for decoding audio data, the device comprising: a receiver configured to receive a bitstream, and a decoder or renderer configured to render, based on a backward-compatible bitstream included in the bitstream and additional encoded bits included in the bitstream, a plurality of output loudspeaker feeds, wherein the backward-compatible bitstream is decodable without using the additional encoded bits, the additional encoded bits specifying spherical harmonics coefficients (SHCs), wherein the SHCs are coefficients of spherical harmonic basis functions.

2. The device of claim 1, wherein the backward-compatible bitstream is formatted according to a multichannel audio format.

3. The device of claim 2, further comprising a plurality of loudspeakers arranged according to a local loudspeaker geometry, the plurality of loudspeakers configured to receive the plurality of output loudspeaker feeds, wherein the receiver is configured to render the plurality of output loudspeaker feeds such that the plurality of output loudspeaker feeds is adapted to the local loudspeaker geometry, the local loudspeaker geometry being different from a loudspeaker geometry corresponding to the multichannel audio format.

4. The device of claim 3, wherein loudspeakers in the loudspeaker geometry corresponding to the multichannel audio format are coplanar and the loudspeakers in the local loudspeaker geometry are not coplanar.

5. The device of claim 1, wherein the bitstream comprises packets, wherein the additional encoded bits are packed into extended portions of the packets.

6. The device of claim 1, wherein the device comprises a demultiplexer configured to demultiplex the backward-compatible bitstream and the additional encoded bits.

7. The device of claim 1, further comprising one or more loudspeakers that receive the plurality of output loudspeaker feeds.

8. The device of claim 1, further comprising a transcoder configured to convert the backward-compatible bitstream into multichannel audio signals.

9. A device for encoding audio data, the device comprising:
an encoder configured to produce, based on a plurality of audio input signals representing a sound field, a bitstream comprising a backward-compatible bitstream and additional encoded bits, wherein the backward-compatible bitstream is decodable without using the additional encoded bits to produce a plurality of output loudspeaker feeds representing the sound field, the additional encoded bits representing a set of higher-order spherical harmonic coefficients (SHCs) in a set of SHCs representing the sound field, but not lower-order SHCs in the set of SHCs representing the sound field, wherein the SHCs are coefficients of spherical harmonic basis functions, each of the higher-order SHCs having a higher order than any of the lower-order SHCs.

10. The device of claim 9, wherein the device comprises two or more microphones configured to receive the audio input signals.

11. The device of claim 9, further comprising a memory configured to store the backward-compatible bitstream and the additional encoded bits.

12. The device of claim 9, wherein the bitstream comprises packets, and the additional bits are packed into fields of the packets designated for user-defined data.

13. The device of claim 9, wherein the encoder is configured to convert the lower-order SHCs into the backward-compatible bitstream.

14. A method of decoding audio data, the method comprising rendering, by a decoder, based on a backward-compatible bitstream included in a bitstream and additional encoded bits included in the bitstream, a plurality of output loudspeaker feeds, wherein the backward-compatible bitstream is decodable without using the additional encoded bits, the additional encoded bits specifying spherical harmonics coefficients (SHCs), wherein the SHCs are coefficients of spherical harmonic basis functions.

15. The method of claim 14, wherein the backward-compatible bitstream is formatted according to a multichannel audio format.

16. The method of claim 15, wherein all loudspeakers in a loudspeaker geometry corresponding to the multichannel audio format are in a single 2-dimensional plane and loudspeakers in a local loudspeaker geometry of the decoder span a 3-dimensional space.

17. The method of claim 15, wherein the multichannel audio format is one of: a 5.1 loudspeaker array format, a 7.1 loudspeaker array format, or a 22.2 loudspeaker array format.

18. The method of claim 14, wherein each output loudspeaker feed of the plurality of output loudspeaker feeds corresponds to a different direction in a set of coplanar directions.

19. The method of claim 14, wherein the SHCs are a first part of a set of SHCs and rendering the plurality of output loudspeaker feeds comprises:
converting the backward-compatible bitstream to a second part of the set of SHCs; and
rendering the set of SHCs to produce the plurality of output loudspeaker feeds.

20. A method of encoding audio data, the method comprising:
converting a plurality of input audio signals into a set of spherical harmonic coefficients (SHCs), wherein the SHCs are coefficients of spherical harmonic basis functions, the set of SHCs consisting of a first subset of SHCs and a second subset of SHCs; and
generating a bitstream comprising a backward-compatible bitstream and additional encoded bits, the backward-compatible bitstream representing the first subset of SHCs in a multichannel audio format, the additional encoded bits representing the second subset of SHCs.

21. The method of claim 20, wherein the first subset of SHCs is recoverable from the backward-compatible bitstream.

22. The method of claim 20, wherein the plurality of input audio signals comprises an audio object.

23. The method of claim 20, wherein each SHC of the first subset of SHCs is a lower order SHC than any SHC of the second subset of SHCs.

24. The method of claim 20, wherein the backward-compatible bitstream is compatible with a channel-based format of an Ultra High Definition Television standard.

* * * * *